United States Patent
Tsuihiji et al.

(10) Patent No.: US 6,830,679 B2
(45) Date of Patent: Dec. 14, 2004

(54) FILTRATION DEVICE

(75) Inventors: Motoyuki Tsuihiji, Ota (JP); Hirofumi Iinuma, Oizumi-machi (JP); Hiroyuki Umezawa, Ota (JP); Masahiro Iseki, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/284,457

(22) Filed: Oct. 31, 2002

(65) Prior Publication Data

US 2003/0089647 A1 May 15, 2003

(30) Foreign Application Priority Data

Oct. 31, 2001 (JP) ........................................ 2001-334302

(51) Int. Cl.[7] .............................................. B01D 37/02
(52) U.S. Cl. ........................... 210/87; 210/97; 210/103; 210/106; 210/193; 210/220; 210/408; 210/411; 210/416.1; 210/490; 210/502.1; 210/739; 210/745; 210/777; 210/791
(58) Field of Search ................................ 210/635, 739, 210/741, 745, 767, 777, 778, 791, 85, 87, 97, 103, 106, 193, 220, 315, 408, 411, 416.1, 490, 502.1

(56) References Cited

U.S. PATENT DOCUMENTS

| | | | | |
|---|---|---|---|---|
| 4,872,988 A | * | 10/1989 | Culkin | 210/636 |
| 5,269,934 A | * | 12/1993 | Dubrovsky et al. | 210/651 |
| 6,547,968 B1 | * | 4/2003 | Rabie et al. | 210/636 |
| 2003/0089647 A1 | * | 5/2003 | Tsuihiji et al. | 210/87 |
| 2003/0094426 A1 | * | 5/2003 | Umezawa et al. | 210/791 |
| 2003/0095894 A1 | * | 5/2003 | Umezawa et al. | 422/101 |

* cited by examiner

*Primary Examiner*—Robert James Popovics
(74) *Attorney, Agent, or Firm*—Morrison & Foerster LLP

(57) ABSTRACT

A filtration device is provided in which wastewater, in the form of a colloidal solution containing microparticles, is guided to tank, circulated, and filtrated using a second filter. The device includes a gel film that is formed by suction on the surface of a first filter. The suction pressure in this process is made extremely weak to maintain the filtration capacity while extending intervals prior to clogging of second filter 2. Furthermore, a filtration device is realized with which the gel film of second filter that becomes adsorbed onto the surface of first filter can be separated readily by stopping the suction and filtration can be continued again thereafter.

19 Claims, 15 Drawing Sheets

34: Pipe
53: Filtration unit
33: Space
30: Frame
31: Filter film
32: Filter film FIG.7A
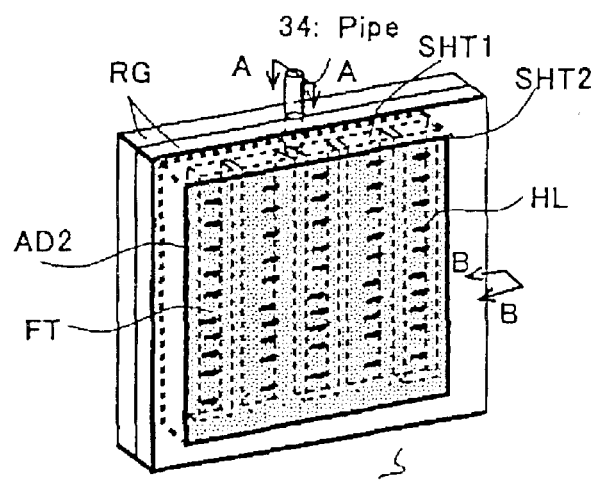
53: Filtration unit
FIG.7D
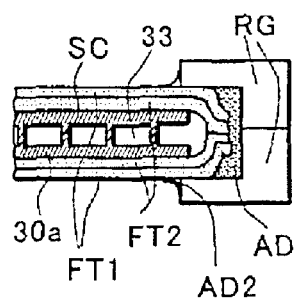
FIG.7C
FIG.7B
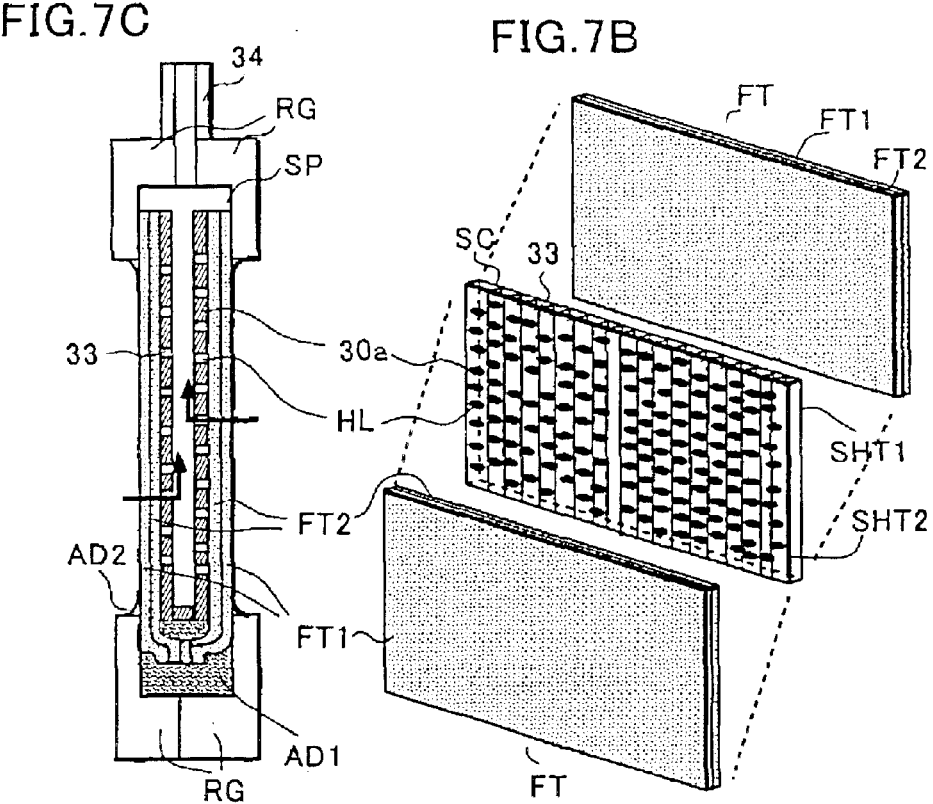

FIG.12

| | | Gel film forming process | Filtration process | Regeneration process | Regeneration fluid collection | Maintenance process | |
|---|---|---|---|---|---|---|---|
| | | | | | | Pipe | Tank |
| Pump | | Run | Run | Stop | Run | Stop | - |
| Optical sensor | | Detected | Undetected | - | - | Maintenance | |
| Valve | CV1 | ○ | ○ | ○ | ○ | ○ | △ |
| | V1 | ● | ○ | ○ | ○ | ○ | ● |
| | V2 | ● | ● | ○ | ● | ○ | △ |
| | V3 | ○ | ● | ● | ● | ● | △ |
| | V4 | ● | ○ | ● | ● | ● | △ |
| | V5 | ● | ● | ● | ○ | ● | △ |
| | V6 | ● | ● | ● | ● | ○ | ○ |
| | D | ● | ● | ● | ● | ○ | ● |
| CV2 | | ○ | ○ | ○ | ○ | ● | ● |
| Air pump | | Run | Run | Run(increase) | Run | Stop | Stop |

○ Open
● Closed
△ Event-driven operation

FILTRATION DEVICE

TECHNICAL FIELD OF THE INVENTION

The present invention relates to a method of filtering and mainly relates to a filtration device for removing objects of removal from fluids with which very minute objects of removal of mainly 0.15 µm or less are contained in a colloidal solution (sol).

BACKGROUND OF THE INVENTION

Presently, diminishing the amount of industrial waste, separate collection and recycling of industrial waste, and preventing release of industrial waste are considered to be ecologically-important topics and business issues as society moves towards the 21st Century. Some types of industrial waste comprise various types of fluids containing objects of removal; i.e., substances to be removed.

Such fluids are known by a variety of expressions, such as sewage, drainage, and effluent. Fluids, such as water or chemicals, containing substances that are objects of removal, shall be hereinafter referred to as "wastewater." The objects of removal are eliminated from wastewater by an expensive filtration system or a similar system. Wastewater is thereby recycled as a clean fluid, and the removed objects or substances that cannot pass through the filtration system are disposed of as industrial waste. In particular, water is sent back to a natural setting, such as a river or sea, or recycled after being purified so as to meet environmental standards.

Adoption of such a filtration system is difficult because of costs incurred in constructing and running a filtration system, thus posing an environmental problem.

As can be seen from the above, wastewater treatment techniques are important in terms of recycling and preventing environmental contamination, and an immediate demand exists for a filtration system that incurs low initial and running costs.

By way of illustration, wastewater treatment as practiced in the field of semiconductors shall now be described. When a plate member formed, for example, from a metal, a semiconductor, or ceramic, is ground or abraded, an abrasion (or grinding) jig or the plate member is subject to a shower of a fluid, such as water, for preventing an increase in the temperature of the abrasion (or grinding) jig, which would otherwise be caused by friction, for improving lubricity, and for preventing adhesion of abrasion or grinding waste onto the plate member.

More specifically, in the process of dicing or back-grinding of plate-like semiconductor material; e.g., a semiconductor wafer, pure water is made to flow over the semiconductor wafer. In a dicing machine, a shower of pure water is made to flow over a semiconductor wafer, or pure water is squirted onto a dicing blade from a discharge nozzle in order to prevent an increase in the temperature of the blade or adhesion of dicing waste onto the semiconductor wafer. For the same reason, a flow of pure water is employed during an operation in which a semiconductor wafer is made thin by back-grinding.

Wastewater, which has mixed therein grinding or abrasion waste and is discharged from the dicing or back-grinding machine, is returned to a natural setting or recycled after having been purified through a filter. Alternatively, concentrated wastewater is recovered.

In a current process for manufacturing a semiconductor, wastewater, in which objects of removal (i.e., waste) primarily consisting of Si are mixed, is disposed of according to one of two methods; i.e., a coagulating sedimentation method and a method which employs a filter and a centrifugal separator in combination.

Under the coagulating sedimentation method, polyaluminum chloride (PAC) or aluminum sulfate ($Al_2(SO_4)_3$) is mixed in the wastewater as a coagulant to generate a reaction product with Si and the wastewater is filtrated to remove this reaction product.

Under the method that employs a filter and a centrifugal separator in combination, the wastewater is filtrated, the concentrated wastewater is processed by the centrifugal separator to recover the silicon waste as sludge, and the clear water resulting from filtration of the wastewater is released to a natural setting or is recycled.

For example, as shown in FIG. 11, wastewater discharged during a dicing operation is collected into a raw water tank 201 and is sent by a pump 202 to a filtration unit 203. A ceramic-based or organic-based filter F is provided in filtration unit 203, and the filtrated water is delivered via a pipe 204 to a collected water tank 205 for recycling. Alternatively, the filtrated water is released to a natural setting.

In filtration unit 203, since clogging of filter F occurs, washing is carried out periodically. For example, a valve B1 connected to raw water tank 201 is closed, a valve B3 and a valve B2, for delivering washing water from the raw water tank are opened, and filter F is cleaned by a reverse flow of water from collected water tank 205. The resultant wastewater containing a high concentration of Si waste is returned to raw water tank 201. Also, the concentrated water in a concentrated water tank 206 is transported via a pump 308 to centrifugal separator 209 and is thereby separated into sludge and separated fluid. The sludge comprising Si waste is collected into a sludge recovery tank 210 and the separated fluid is collected into a separated-fluid tank 211. After further accumulation of the separated fluid, the wastewater in separated-fluid tank 211 is transported to raw water tank 201 via pump 212.

These methods have also been employed for the recovery of waste resulting from grinding or abrasion of a solid or plate-like member formed essentially from a metal material, such as Cu, Fe, Al, etc., or from grinding or abrasion of a solid or plate-like member formed from ceramic or other inorganic material.

Chemical-mechanical polishing (CMP) has come to be employed as a new semiconductor processing technology.

This CMP technique enables (1) the realization of smooth device surface shapes; and (2) the realization of structures with embedded materials that differ from the substrate.

With regard to (1) above, fine patterns are formed precisely using lithography techniques. The combined use of techniques for affixing Si wafers enables materialization of three-dimensional IC's.

With (2), embedded structures are made possible. Since priorly, a technique of embedding tungsten (W) has been employed in multilayer wiring of IC's. With this technique, W is embedded by a CVD method in a trench of an interlayer film and the surface is made smooth by etching back. However, smoothing by CMP has come to be employed recently. Other examples of application of this embedding technique include damascene processes and element separation.

Such CMP techniques and applications are described in detail in "Science of CMP," published by Science Forum Co., Ltd.

A mechanism for a CMP process shall now be described briefly. As shown in FIG. 12, a semiconductor wafer 252 is placed on an abrasive cloth 251 placed over a rotary table 250, and irregularities of the wafer 252 surface are eliminated by performing lapping, polishing, and chemical etching while pouring on an abrasive (slurry) 253. Smoothing is achieved by chemical reactions induced by a solvent included in abrasive 253 and by mechanical abrasive actions of the abrasive cloth and the abrasive grains in the abrasive. Foamed polyurethane or non-woven fabric, etc., is used, for example, as abrasive cloth 251. The abrasive has abrasive grains of silica, alumina, etc., mixed in water containing a pH regulator and is generally referred to as slurry. Lapping is performed while pouring on this slurry 253 and applying pressure onto abrasive cloth 251 while rotating wafer 252. A dressing part 254, maintains the abrading ability of abrasive cloth 251 and constantly keeps the surface of abrasive cloth 251 in a dressed condition. Numerals 202, 208, and 212 indicate motors and 255 to 257 indicate belts.

The above-described mechanism is arranged as a system as shown for example in FIG. 13. This system largely comprises a wafer cassette loading/unloading station 260, wafer transfer mechanism part 261, the abrasive mechanism part 262, which is described using FIG. 12, a wafer cleaning mechanism part 263, and a system controller for controlling these parts.

A cassette 264 having wafers stored therein is placed in wafer cassette loading/unloading station 260, and a wafer is taken out of cassette 264. In the wafer transfer mechanism part 261, the wafer is retained, for example, by a manipulator 265, and is placed on rotary table 250 disposed in abrasive mechanism part 262. The wafer is then smoothed by the CMP technique. After smoothing of the wafer has been completed, the wafer is transported by manipulator 266 to wafer cleaning mechanism part 263 wherein the slurry is cleaned off of the wafer. The washed wafer is then housed in wafer cassette 266.

The amount of slurry used for one abrasion process is about 500 cc to 1 liter/wafer. Also, pure water is made to flow in the above-described abrasive mechanism part 262 and wafer cleaning mechanism part 263. Since the resulting wastewater is merged in the final stage at a drain, about 5 to 10 liters/wafer of wastewater flows out during a single smoothing operation. In the case of producing, for example, a three-layer-metal wafer, about seven smoothing operations are required for smoothing the metal and interlayer dielectric films. Thus, wastewater of an amount of seven times the 5 to 10 liters is discharged for producing of a single wafer.

It can thus be understood that the use of a CMP machine involves discharge of a considerable amount of slurry diluted with pure water.

Such wastewater has conventionally been by a coagulating sedimentation method.

However, chemicals are used as coagulants in a coagulating sedimentation method. Specifying the amounts of chemicals that will react completely is very difficult, and hence excess amounts of chemicals are loaded and unreacted chemicals remain. Oppositely, if the amounts of chemicals are low, not all of the objects of removal will coagulate and settle and some of the objects of removal will thus remain unseparated. Especially in a case where excess amounts of chemicals are used, chemicals will remain in a supernatant liquid, and with regard to recycling, such a supernatant liquid could not be recycled for use in applications in which chemical reactions must be avoided since the chemicals remain in the liquid even after passage through a filter.

Also, floc, which is a reaction product of a chemical and objects of removal, is generated in the form of a tuft-like suspended solid. Production of such floc is achieved under strict pH conditions and requires an agitator, a pH measurement instrument, a coagulant injection apparatus, and control equipment for controlling these components. Also, stable sedimentation of floc requires a large-size precipitation tank. For example, for a wastewater treatment capacity of 3 cubic meters ($m^3$)/hour, a precipitation tank with a diameter of 3 meters and a depth of about 4 meters (i.e., a precipitation tank with a capacity of about 15 tons) is required. As a result, the entire system will be a large-scale system requiring floor space of about 11 meters×11 meters.

Furthermore, some of the floc float on the surface without settling to the bottom of the precipitation tank and such floc may flow out of the precipitation tank. The recovery of all of the floc is thus difficult. In short, the known filtration system suffers such problems as large facility size, high initial costs required by the system, difficulties in recycling water, and high running costs incurred by use of chemicals.

On the other hand, with a method, such as that shown in FIG. 13, which employs a filter having a filtering capacity of 5 cubic meters ($m^3$)/hour and a centrifugal separator in combination, recycling water becomes possible due to the use of a filter F (which is called a UF module and comprises polysulfone fibers or a ceramic filter) in filtration unit 203. However, filtration unit 203 is equipped with four filters F and, in view of the life of the filters F, the high-priced filters F, costing about 500,000 yen each, had to be replaced at least once a year. Furthermore, since filters F are to be used with a pressure filtration method, clogging of the filters placed a large motor load and pump 202 thus had to be high capacity. Also, of the wastewater passing through filter F, about two-thirds is returned to raw water tank 201. Furthermore, wastewater containing objects of removal is transported by pump 202, causing the interior wall of pump 202 to be scraped by the objects of removal and thus greatly shortening the life of pump 202.

To summarize the above, the known filtration system suffers high running costs, specifically, the cost of electricity consumed by the motor and expenditures required for replacing pump P and filters F.

Furthermore, in comparison to a dicing process, an incomparable amount of wastewater is discharged during a CMP process. A slurry is distributed in the form of a colloid in a fluid and does not precipitate readily due to Brownian motion. Moreover, the abrasive grains mixed in the slurry are very minute and comprise grains with particle diameters of 10 to 200 nm. When a slurry comprising such fine abrasive grains is filtrated through a filter, the abrasive grains enter the pores of the filter and cause clogging immediately and frequently, thus making treatment of a large amount of wastewater impossible.

As can be understood from the foregoing description, in order to eliminate maximal amounts of substances harmful to the global environment and recycle filtrated fluids or separated objects of removal, various devices had to be added to the wastewater filtration apparatus, thus making the system large in scale and leading to enormous initial costs and running costs. Known sewage treatment apparatuses were therefore systems that could not be employed.

SUMMARY OF THE INVENTION

The present invention has been conceived in view of the foregoing problems and is aimed at providing a filtration device comprising a tank which contains a fluid with objects of removal in the form of a colloidal solution. A filtration unit is formed of a first filter, which is immersed inside the above-mentioned tank. A second filter, comprising a gel film that is adsorbed onto the surface of the first filter, is also provided. A pump is provided for suctioning the above-mentioned fluid via a first pipe connected to the above-mentioned filtration unit. A second pipe is provided for removing filtrated fluid from the above-mentioned pump out to the exterior of the above-mentioned tank. The above-mentioned objects of removal in the above-mentioned fluid are concentrated in the above-mentioned tank.

The present invention is also aimed at providing a filtration device, wherein a gel film formed from the objects of removal is used as the second filter.

The present invention is also aimed at providing a filtration device, wherein the above-mentioned filtration unit comprises a frame, the above-mentioned first filter, which has the surroundings thereof supported by the above-mentioned frame, and the above-mentioned second filter, which is adsorbed onto the surface of the above-mentioned first filter.

The present invention is also aimed at providing a filtration device, wherein the above-mentioned filtration unit has two of the above-mentioned first filters disposed on the respective sides of the above-mentioned frame, a hollow part is formed between the above-mentioned frame and the above-mentioned first filters, the above-mentioned first pipe is connected to an upper part of the above-mentioned frame, and filtrated fluid is suctioned by the above-mentioned pump from the above-mentioned hollow part.

The present invention is also aimed at providing a filtration device, wherein the above-mentioned filtration unit comprises: the above-mentioned frame; a spacer provided with a plurality of holes; the above-mentioned first filter, which covers the above-mentioned spacer; and the above-mentioned second filter, which is adsorbed onto the surface of the above-mentioned first filter; and the above-mentioned spacer provides support when the above-mentioned first filter depresses inwards when suction is applied.

The present invention is also aimed at providing a filtration device, wherein the above-mentioned first filter is formed of a polyolefin-based polymer and the filter pores are larger than the diameters of the above-mentioned objects of removal.

The present invention is also aimed at providing a filtration device, wherein a plurality of the above-mentioned filtration units are disposed vertically and in a spaced manner in the above-mentioned fluid.

The present invention is furthermore aimed at providing a filtration device, wherein an aeration pipe is disposed at a bottom part of the above-mentioned tank and bubbles generated from the above-mentioned aeration pipe rise along the surface of the above-mentioned filtration unit to cause a parallel flow of the above-mentioned fluid along the above-mentioned filtration unit.

The present invention is furthermore aimed at providing a filtration device, wherein the above-mentioned pump is a compact, low power consumption pump that realizes weak suction pressure.

The present invention is furthermore aimed at providing a filtration device, wherein the above-mentioned first pipe is provided with a pressure gauge for measuring the suction pressure of the above-mentioned filtration unit.

The present invention is furthermore aimed at providing a filtration device, wherein a flow meter is inserted inside the above-mentioned second pipe and the suction pressure of the above-mentioned pump is controlled so as to keep the filtration flow rate measured by the above-mentioned flow meter fixed.

The present invention is furthermore aimed at providing a filtration device, wherein the above-mentioned second pipe is provided with an optical sensor at an end part thereof and is branched into a third pipe for taking filtrated fluid out to the exterior of the above-mentioned tank and a fourth pipe that returns filtrated fluid to the above-mentioned tank. Switching between the above-mentioned third and fourth pipes is carried out in accordance with the optical transmittance detected by the above-mentioned optical sensor.

The present invention is furthermore aimed at providing a filtration device, wherein an auxiliary tank, connected to the above-mentioned first pipe, is provided and filtrated fluid is collected in the above-mentioned auxiliary tank.

The present invention is furthermore aimed at providing a filtration device, wherein the above-mentioned objects of removal comprise a CMP slurry.

The present invention is furthermore aimed at providing a filtration device comprising: a tank, containing a fluid that contains objects of removal in the form of a colloidal solution; a filtration unit, formed of a first filter, which is immersed inside the above-mentioned tank, and a second filter, comprising a gel film that is adsorbed onto the surface of the first filter; a pump, for suctioning the above-mentioned fluid via a first pipe connected to the above-mentioned filtration unit; a second pipe, for taking filtrated fluid from the above-mentioned pump out to the exterior of the above-mentioned tank; and a third pipe for taking filtrated fluid out of the above-mentioned tank and a fourth pipe for returning filtrated fluid to the above-mentioned tank, which are branched, via an optical sensor, from the above-mentioned second pipe; and wherein during the process of forming the above-mentioned second filter, the above-mentioned fluid is circulated along a path running from the above-mentioned filtration unit to the above-mentioned first pipe, the above-mentioned pump, the above-mentioned second pipe, the above-mentioned optical sensor, and the above-mentioned fourth pipe.

The present invention is furthermore aimed at providing a filtration device, wherein the suction pressure of the above-mentioned pump during formation of the above-mentioned second filter is set lower than the suction pressure during filtration to form the above-mentioned second filter gently and keep the filtration flow rate fixed during formation of the above-mentioned second filter and during filtration.

The present invention is furthermore aimed at providing a filtration device, wherein the suction pressure of the above-mentioned pump during formation of the above-mentioned second filter is set lower than the suction pressure during filtration to form the above-mentioned second filter gently and keep the suction pressure fixed during formation of the above-mentioned second filter and during filtration.

The present invention is furthermore aimed at providing a filtration device, wherein switching from the above-mentioned fourth pipe to the above-mentioned third pipe is carried out to transfer to the filtration process when the optical transmittance detected by the above-mentioned optical sensor becomes greater than or equal to a fixed value.

The present invention is furthermore aimed at providing a filtration device comprising: a tank containing a fluid with objects of removal in the form of a colloidal solution; a filtration unit, formed of a first filter, which is immersed inside the above-mentioned tank, and a second filter, comprising a gel film that is adsorbed onto the surface of the first filter; a pump, for suctioning the above-mentioned fluid via a first pipe connected to the above-mentioned filtration unit;

a second pipe, for taking filtrated fluid from the abovementioned pump out to the exterior of the above-mentioned tank; and a flow meter, inserted in the above-mentioned second pipe; and wherein in the process of filtering the above-mentioned fluid by the above-mentioned filtration unit, the suction pressure of the above-mentioned pump is increased so as to keep the filtration flow rate measured by the above-mentioned flow meter constant.

The present invention is furthermore aimed at providing a filtration device comprising: a tank containing a fluid with objects of removal in the form of a colloidal solution; a filtration unit, formed of a first filter, which is immersed inside the above-mentioned tank, and a second filter, comprising a gel film that is adsorbed onto the surface of the first filter; a pump, for suctioning the above-mentioned fluid via a first pipe connected to the above-mentioned filtration unit; a second pipe, for taking filtrated fluid from the abovementioned pump out to the exterior of the above-mentioned tank; and an auxiliary tank, connected to the abovementioned first pipe and collecting filtrated fluid; wherein when the above-mentioned second filter becomes clogged and the filtration flow rate decreases, the above-mentioned pump is stopped to eliminate the suction pressure applied to the above-mentioned filtration unit and the filtrated fluid collected in the above-mentioned auxiliary tank is made to flow in reverse via the above-mentioned first pipe to the above-mentioned filter to thereby apply hydrostatic pressure to the above-mentioned filtration unit from the interior, to cause the above-mentioned first filter to swell outwards, and to cause the gel that has become adsorbed onto the surface of the above-mentioned second filter to separate.

The present invention is furthermore aimed at providing a filtration device, wherein the above-mentioned hydrostatic pressure is determined by the difference in the liquid level of the above-mentioned auxiliary tank and that of the abovementioned tank.

The present invention is furthermore aimed at providing a filtration device, wherein an aeration pipe is disposed at a bottom part of the above-mentioned tank and the amount of bubbles generated is increased in comparison to that during filtration.

The present invention is furthermore aimed at providing a filtration device, wherein when regeneration of the abovementioned second filter is completed, the above-mentioned pump starts re-filtration of the above-mentioned fluid.

The present invention is furthermore aimed at providing a filtration device, wherein when the regeneration of the above-mentioned second filter is completed, the abovementioned pump starts re-filtration of the above-mentioned fluid and the filtrated water is supplied to the abovementioned auxiliary tank.

Generally, for eliminating particulate matter of 200 nm or less, such as the abrasive grains mixed in a CMP slurry, a filter film having pores smaller than the particulate matter is employed. However, with the present invention, a gel film, formed from the objects of removal, is used as the filter and the numerous gaps that form in the filter are used as paths for passage of fluid. Also with this invention, since the filter itself is a cluster of particulate matter of the objects to be removed, the objects to be removed that cause clogging can be separated from the filter, enabling the realization of maintenance of the filtration capacity. Furthermore with this invention, even when the gel film filter becomes clogged as a result of continued filtration, the filter can be regenerated to continue filtration and realize filtration over a long period of time.

BRIEF DESCRIPTION OF THE DRAWINGS

FIGS. 7A–7D illustrate a filtration unit according to the invention;

FIG. 12 is an illustration for describing the operation conditions of the filtration device according to the invention;

DETAILED DESCRIPTION OF THE INVENTION

Figure 1:
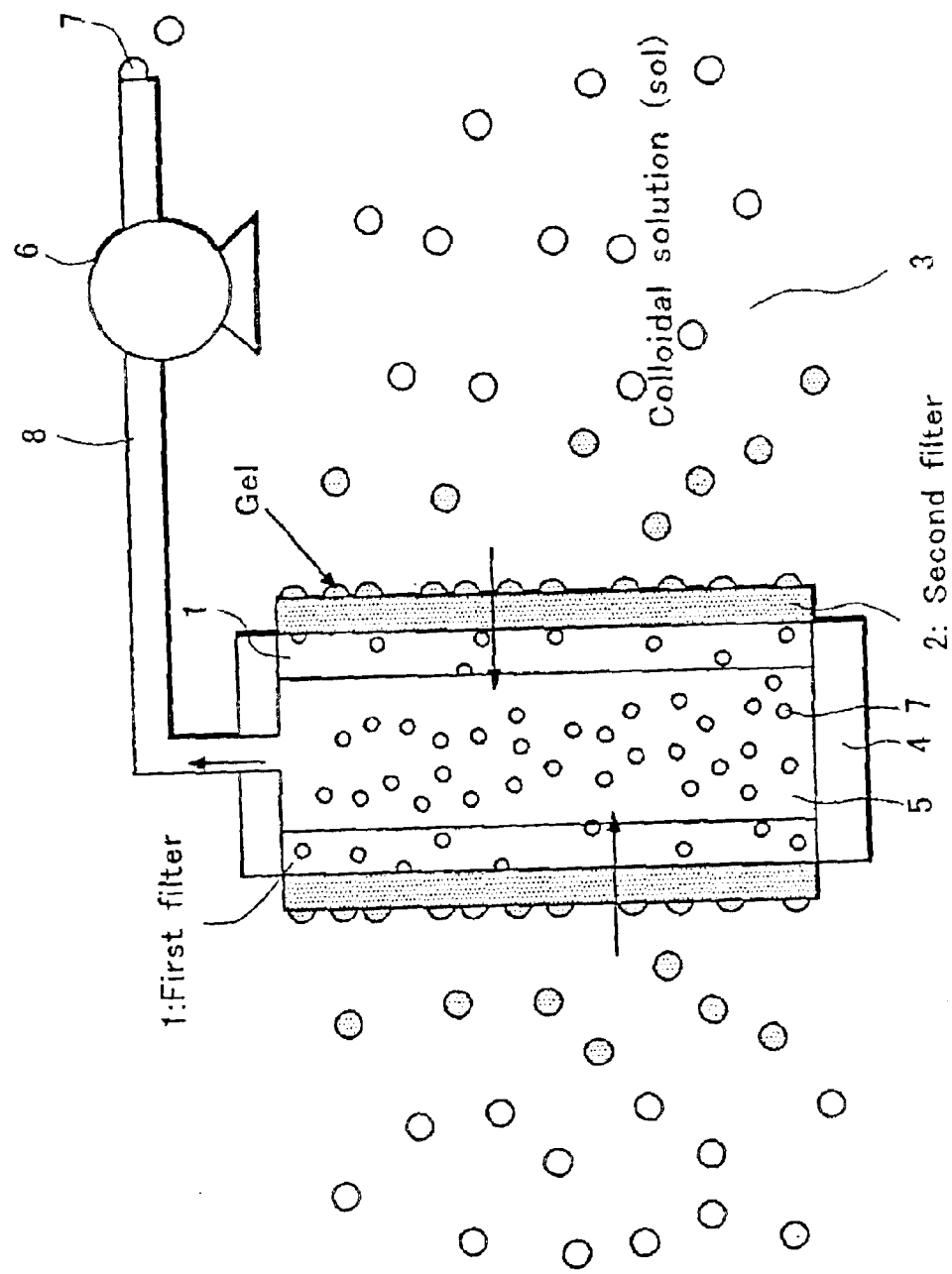
FIG. 1 is an illustration of a filter according to the invention.

A "colloidal solution" refers to a state wherein microparticles of diameters of 1 nm to 1 $\mu$m are dispersed in a medium. These microparticles undergo Brownian motion and have a property of passing through ordinary filter paper but not passing through a semipermeable film. These microparticles also have a property of being extremely slow in coagulation rate, which is considered to be due to the reduced opportunity of mutual approach of the microparticles resulting from the acting of electrostatic repulsive forces among the microparticles.

The term "sol" is used substantially synonymously to "colloidal solution," and unlike a gel, a sol is dispersed in liquid, exhibits fluidity, and the microparticles undergo active Brownian motion.

A "gel" refers to a state wherein colloidal particles have lost their abilities to move independently and have grouped together and solidified. For example, though agar or gelatin becomes dispersed and becomes a gel when dissolved in warm water, this sol loses fluidity and turns to a gel when cooled. Among gels are hydrogels, which have a high liquid content, and xerogels, which are somewhat dry.

Causes of gelation include drying by removal of the water that is the dispersant, adjustment of the pH of a silica slurry (pH 9 to 10) to pH 6 to 7 by addition of an electrolyte, reduction of fluidity by cooling, etc.

A "slurry" refers to a colloidal solution or sol, which is used for abrading and is prepared by mixing particles, a liquid, and chemicals. An abrasive used in CMP is called a "CMP slurry." Known examples of CMP slurries include silica abrasives, aluminum oxide (alumina) abrasives, cerium oxide (ceria) abrasives, etc. Among these, silica abrasives are used most often, and among such silica abrasives, colloidal silica is used widely. Colloidal silica is a dispersion in which silica ultramicroparticles with a colloid size of 7 to 300 nm are dispersed uniformly without settling in water or an organic solvent and is also referred to as "silica sol." With this colloidal silica, particles are monodispersed in water, and the mutual repulsive forces among the colloidal particles thus prevent the particles from settling even when left still for a year or more.

This invention provides a method of filtering, with which objects of removal are removed by filtration from wastewater of a state wherein the objects of removal are contained in a fluid in the form of a colloidal solution or sol.

The objects of removal take the form of a colloidal solution (sol) containing large amounts of microparticles with a particle distribution of 3 nm to 2 $\mu$m. Examples include abrasive grains of silica, alumina, or ceria, etc., that are used in CMP and semiconductor waste, metal waste, and/or insulating film material waste that are produced by abrasion by the abrasive grains. With the present embodiment, W2000 tungsten abrading slurry, made by Cabot Corp., was used as the CMP slurry. This slurry has a pH of 2.5 and has silica with a grain size distribution of 10 to 200 nm as its principal component.

The principles of the present invention shall now be described with reference to FIG. 1.

This invention is a method of removal by a filter for objects of removal, mixed in the form of a colloidal solution (sol) in a fluid (wastewater), by a gel film formed from the objects of removal.

To be more specific, a gel film, which is to be formed as a second filter 2 from the CMP slurry that is the colloidal solution containing the objects of removal, is formed on the surface of an organic-polymer-based first filter 1, and these filters 1 and 2 are immersed in a fluid 3 inside a tank in order to filter wastewater containing the objects of removal.

In principle, as first filter 1, either an organic-polymer-based filter or a ceramic-based filter may be used as long as the gel film can be attached. Here, a polyolefin-based polymer film with an average pore diameter of 0.25 $\mu$m and a thickness of 0.1 mm was employed. A photographic image of the surface of this polyolefin-based filter film is shown in FIG. 2B.

First filter 1 has the structure of a flat film disposed on both sides of a frame 4 and is immersed vertically into the fluid, and filtrate 7 is arranged to be taken out from a hollow part 5 of frame 4 by suction from a pump 6.

Second filter 2 is a gel film, which is attached to the entire surface of first filter 1 and is formed by suction and gelation of the sol of the objects of removal. Since a gel film has a jelly-like form, it is generally considered as not having the function of a filter. However, with the present invention, this gel film can be made to have the function of second filter 2 by selection of the gel film forming conditions. These forming conditions shall be described in detail later.

Formation of second filter 2, which is a gel film of the objects of removal, from the above-described colloidal solution (sol) of the objects of removal and the filtration by which the objects of removal are removed, shall now be described with reference to FIGS. 1 and 2A.

Numeral 1 indicates the first filter and numeral 11 indicates filter pores. The film that is formed as layers at the openings of filter pores 11 and on the surface of first filter 1 is the gel film of the objects of removal 13. The objects of removal 13 are sucked in via first filter 1 by suction pressure from a pump, and due to the drying (dehydration) of fluid 3 by the suctioning of the water content, the particles of the objects of removal in the colloidal solution gels and binds, thereby forming on the surface of first filter 1 a large gel film that cannot pass through filter pores 11. This gel film forms second filter 2.

When the film of second filter 2 reaches a certain thickness, gaps that do not allow passage of the gel of the objects of removal are formed in second filter 2, and filtration of the objects of removal in the colloidal solution by use of this second filter 2 is thereby started. Thus as filtration is continued while performing suction by pump 6, the gel film on second filter 2 gradually becomes layered and thick, and eventually, second filter 2 becomes clogged, thereby preventing further filtration. In this process, the colloidal solution of the objects of removal attaches onto the surface of second filter 2 while gelling and the water of the colloidal solution passes through first filter 1 and is taken out as filtrated water.

Figure 2A:
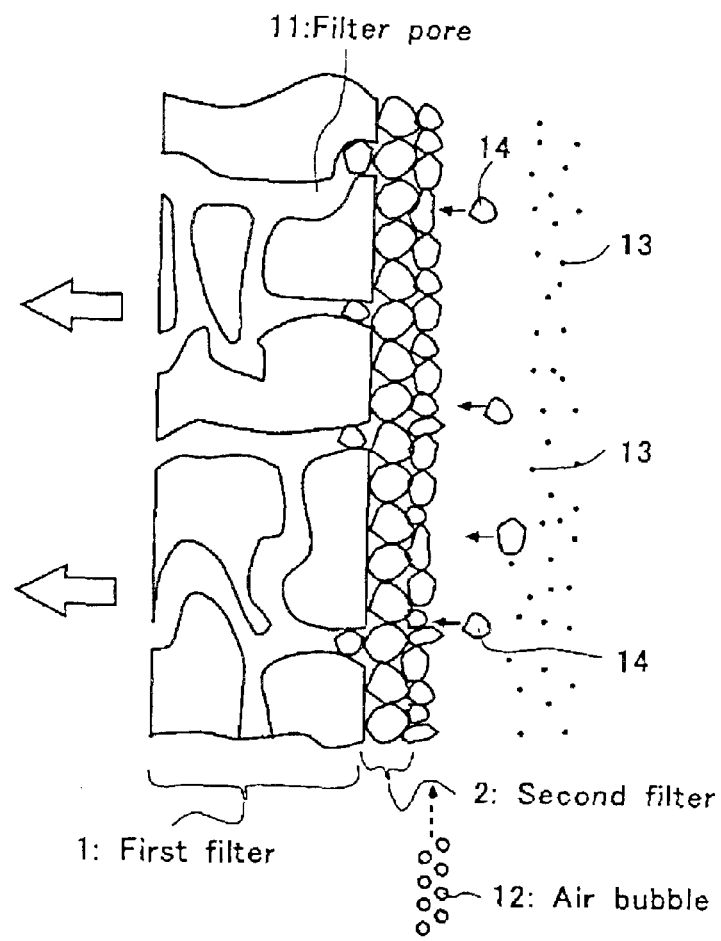
FIGS. 2A and 2B illustrate the operation of the filter according to the invention.
Figure 2B:
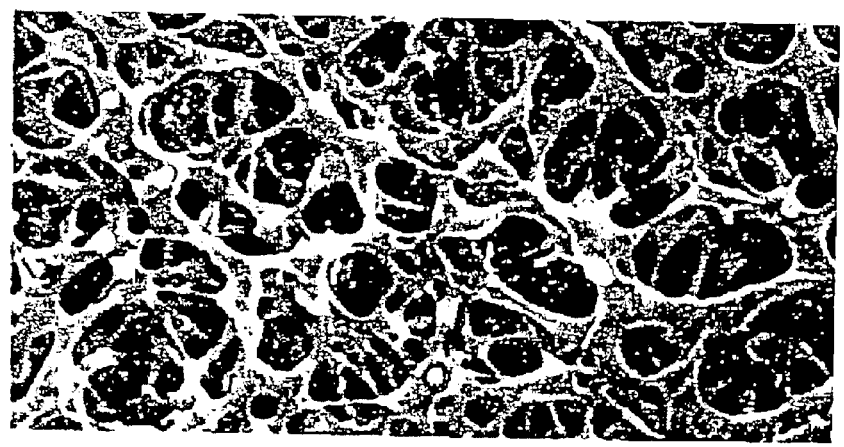

In FIG. 2A, wastewater, in the form of a colloidal solution having the objects of removal mixed therein, exists at one side of first filter 1, and filtrated water that has passed through first filter 1 is produced at the opposite side of first filter 1. The wastewater is suctioned and made to flow in the direction of the arrow, and as the microparticles in the colloidal solution are made to approach first filter 1 by the suction, the microparticles lose their electrostatic repulsive force and gel, and a gel film, resulting from the binding of several microparticles, become adsorbed onto the surface of first filter 1, thereby forming second filter 2. By the action of this second filter 2, filtration of the wastewater is carried out as the objects of removal in the colloidal solution while being gelled. Filtrated water is suctioned from the opposite side of first filter 1.

Thus, by slowly suctioning the colloidal solution wastewater via second filter 2, the water in the wastewater is taken out as filtrated water and the objects of removal gel upon drying and become layered and captured as the gel film on the surface of second filter 2.

The conditions for forming second filter 2 shall now be described with reference to FIG. 3. FIG. 3 shows the formation conditions and the filtration amount of second filter 2.

The method of this invention comprises the processes of forming second filter 2 and filtering. The filtration rate of purified water in the filtration process differs greatly with the conditions for forming of second filter 2, and, it becomes clear that unless the conditions for forming second filter 2 are not selected appropriately, filtration by second filter 2, which is a gel film, can hardly be performed. This is in agreement with the fact that it had previously been the that the filtration of a colloidal solution is impossible.

Figure 3A:
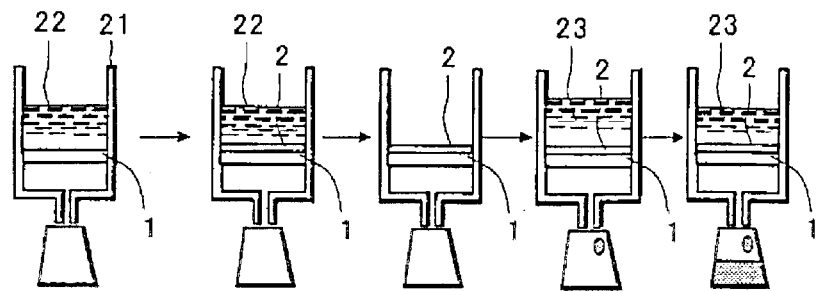
FIGS. 3A and 3B are a sectional view and a characteristics illustration, respectively, for describing the forming conditions of a second filter according to the invention.
Figure 3B:
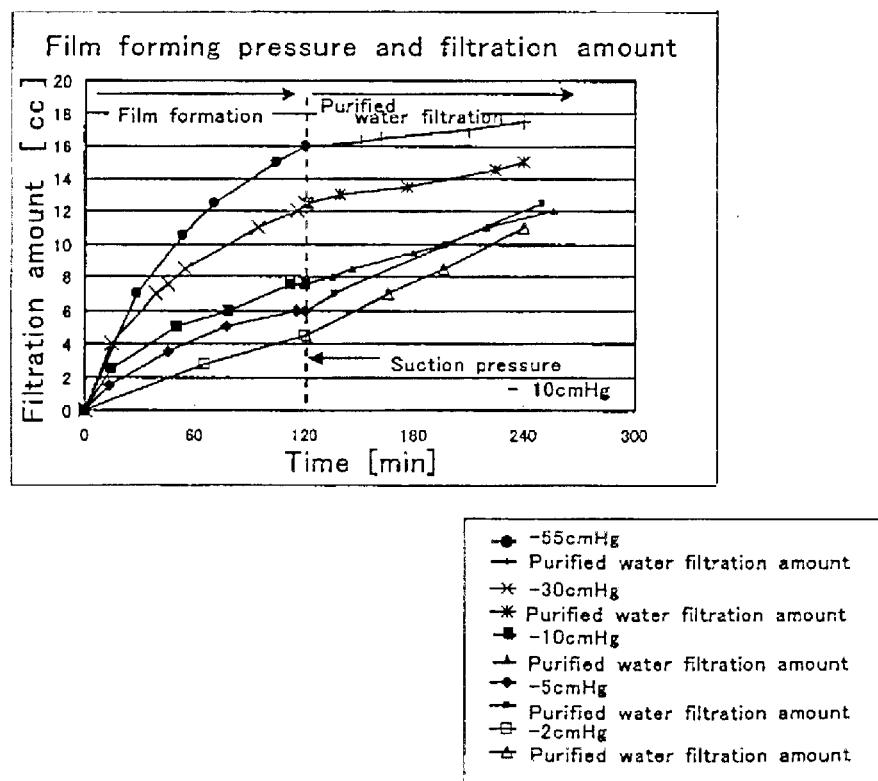

The characteristics shown in FIG. 3B were determined by experiments performed according to the method illustrated in FIG. 3A. That is, first filter 1 is disposed at the bottom of a cylindrical container 21, 50 cc of the raw fluid of W2000 tungsten abrasion slurry 22, made by Cabot Corp., are placed inside the container, and the formation of a gel film is carried out at various suction pressures. The remaining slurry 22 is subsequently thrown out, 10 cc of purified water 23 is placed in the container, and filtration is performed at an extremely low suction pressure. The filtration characteristics of the gel film that is to be second filter 2 can thus be examined. The first filter 1 used here had a diameter of 47 mm and an area of 1734 mm².

As shown in FIG. 3B, for the gel film forming process, the suction pressure was set at the various values of −55 cmHg, −30 cmHg, −10 cmHg, −5 cmHg, and −2 cmHg, and film formation was carried out for 120 minutes, after which the properties of the gel film were examined. As a result, it was found that the filtration amount was highest at 16 cc at 2 hours when the suction pressure was set to a strong pressure of −55 cmHg, and decreased in the order of 12.5 cc, 7.5 cc, 6 cc, and 4.5 cc.

Replacement by purified water is then carried out and filtration by the gel film is performed. At this point, the suction pressure is set to a fixed level of −10 cmmHg. With the gel film formed at a suction pressure of −55 cmHg, a filtration rate of only 0.75 cc/hour could be achieved. The filtration rate of the gel film formed at a suction pressure of −30 cmHg was approximately 1 cc/hour. However, with a gel film formed at a suction pressure of −10 cmHg, the filtration rate was 2.25 cc/hour, with a gel film formed at a suction pressure of −5 cmHg, the filtration rate was 3.25 cc/hour, and with a gel film formed at a suction pressure of −2 cmHg, the filtration rate was 3.1 cc/hour, thus showing that with a gel film that is formed at an extremely weak suction pressure, stable filtration can be performed in the filtration process. These experimental results clearly show that by setting the suction pressure to a level at which the filtration rate will be approximately 3 cc/hour in the process of forming the gel film of second filter 2, the filtration rate in the subsequent filtration process will be maximized.

The reason for the above results is considered to be because when the suction pressure is high, the gel film that is formed becomes less filled with fluid and thus dense and hard. The gel film is thus formed in a contracted state of low-water content in which there are hardly any paths for the permeation of purified water.

On the other hand, when the suction pressure is made weak, the gel film that is formed becomes more filled with fluid and thus low in density and soft. The gel film is thus formed in a swollen state of high water content, thus enabling many paths for the permeation of purified water to be secured. This can be readily understood by an analogy to a gradual accumulation of powdery snow. A characteristic of the present invention is that a highly swollen gel film, which has been formed at a weak suction pressure, is used to realize filtration that makes of use of the permeation of water through this gel film.

The characteristics of the gel film shall now be described with reference to FIG. 4.

Figure 4A:
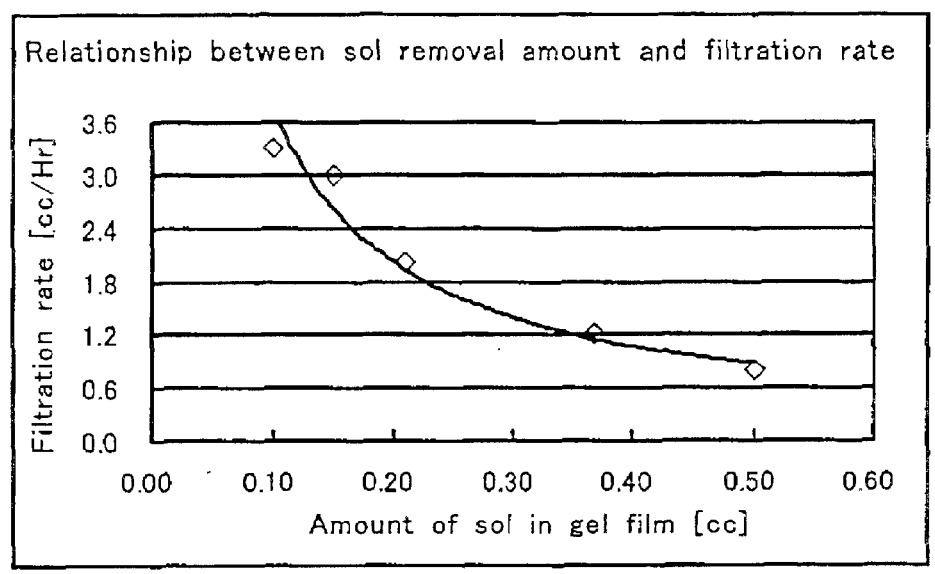
FIGS. 4A and 4B are illustrations describing the characteristics of the second filter of the invention.

FIG. 4A shows the relationship between the amount of sol contained in a gel film and the filtration rate. For the sol removal amount, the amount of sol captured by first filter 1 is determined from the filtration rate during the formation of a gel film from purified water with a slurry concentration of 3%. This sol amount is considered to be the amount of sol that has gelled and has become attached as second filter 2 due to drying by suction. From this it can be understood that the sol amount is low when second filter 2 is formed by weak suction. That is, the sol amount that is consumed when the filtration rate is 3 cc/hour is an extremely low amount of 0.15 cc and the filtration rate becomes higher the lower the amount of sol contained in second filter 2. This indicates an important point of this invention, that is, that the realization of filtration of wastewater in the form of a colloidal solution is enabled by forming second filter 2 with as low a sol amount as possible.

Figure 4B:
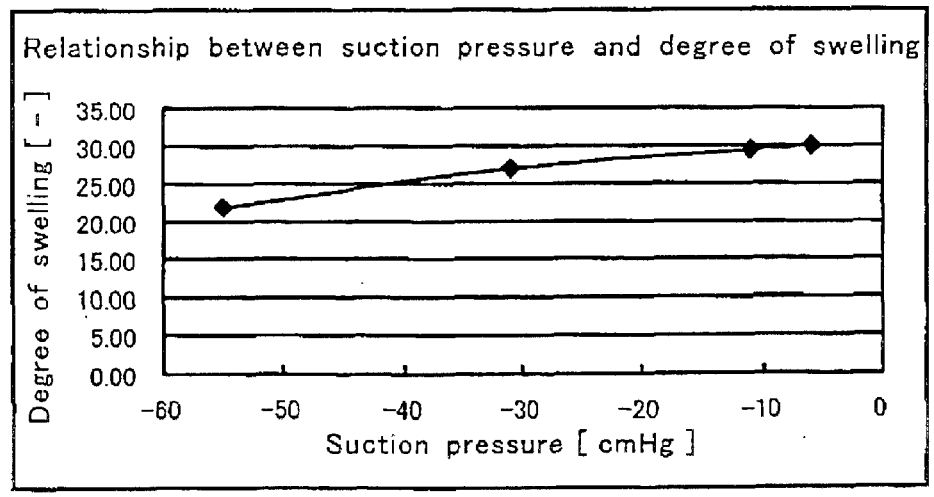

The degree of swelling of the sol, that is, the density of the sol in the gel film as determined from the above-mentioned sol removal amount and the volume of the gel film is shown in FIG. 4B. The experimental results of the film thickness of second filter 2 being 6 mm when the suction pressure is −30 cmhg and the film thickness of second filter 2 being 4 mm when the suction pressure is −10 cmHg indicate that the degree of swelling increases from 27 to 30, that is, indicates that the greater the suction pressure, the lower the degree of swelling and the higher the density of the sol of second filter 2. What is furthermore important is that the lower the suction pressure, the thinner the film thickness and yet the greater the degree of swelling of second filter 2, giving further grounds to what is indicated by FIG. 3B, i.e., that when second filter 2 is formed at a weak suction pressure, the filtration rate during filtering is high and filtration can be performed over a long period of time.

It is thus clear that this invention's major characteristic of enabling filtration of wastewater of the form of a colloidal solution of microparticles of mainly 0.15 $\mu$m or less is strongly dependent on the forming conditions of second filter 2.

FIG. 2 shows one side of the filter of FIG. 1 and is actually a schematic view that illustrates how the gel film becomes attached.

First filter 1 is immersed in a vertically upright manner in a colloidal solution wastewater, and the wastewater is a colloidal solution in which objects of removal 13 are dispersed. Objects of removal 13 are indicated by small black circles. When the wastewater is sucked through first filter 1 at a weak suction pressure by pump 6, the microparticles of the objects of removal gel as they approach first filter 1 and become adsorbed onto the surface of first filter 1. Of the gelled microparticles 14, indicated by white circles, those that are larger than the filter pores 11 of first filter 1 gradually become adsorbed and layered on the surface of first filter 1, thereby forming second filter 2 comprising a gel film. Though gelled microparticles 14 that are smaller in diameter than filter pores 11 pass through first filter 1, they do not present a problem since, in the process of forming second filter 2, the filtrated water is circulated back to the wastewater. Second filter 2 is thus formed over a period of approximately 120 minutes as mentioned above. In this film forming process, since suction at an extremely weak suction pressure is performed, the gelled microparticles 14 are layered while forming gaps of various shapes, thereby forming second filter 2 as a soft gel film of extremely high degree of swelling. The water in the wastewater is suctioned and made to permeate through this gel film of high degree of swelling and pass through first filter 1 to be taken out as filtrated water, and the wastewater is thus filtrated in the final stage.

That is, with this invention, second filter 2 is formed as a gel film of a high degree of swelling, and by repeating the contraction of the gel film by dehydration of the water contained in the gel film in contact with first filter 1 by suction at a weak suction pressure from the first filter 1 side and the swelling of this gel film by causing water to permeate and be replenished from the gel film in contact with the wastewater, just the water is made to permeate and be filtrated through second filter 2.

Also, air bubbles 12 are sent up to first filter 1 from the bottom of the wastewater to form a parallel flow of wastewater along the surface of first filter 1. This causes second filter 2 to become attached uniformly over the entire surface of first filter 1 and to become attached softly while forming gaps. Though to be more specific, the air flow rate is set to 1.8 liters/minute, this flow rate is selected according to the film quality of second filter 2.

In the subsequent filtration process, the gelled microparticles 14, indicated by white circles, are made to become adsorbed and gradually layered on the surface of second filter 2 by the weak suction pressure. In this process, purified water permeates through second filter 2 and the gelled microparticles 14, which are indicated by white circles and become layered further, and is taken out from first filter 1 as filtrated water. That is, in the case of CMP, abrasive grains of silica, alumina, or ceria, etc., and processing waste, such as semiconductor waste, metal waste, and/or insulating film material waste that are produced by abrasion by the abrasive grains, become layered and captured as gel on the surface of second filter 2 and the water permeates through the gel film and can be taken out as filtrated water from first filter 1.

However, as shown in FIG. 3B, when filtration is continued over a long period of time, the gel film becomes attached thickly onto the surface of second filter 2, causing clogging and disabling removal of filtrated water. Thus, in order to regenerate the filtration ability, the layered gel film must be removed.

A more specific filtration device shall now be described with reference to FIG. 5.

Figure 5:
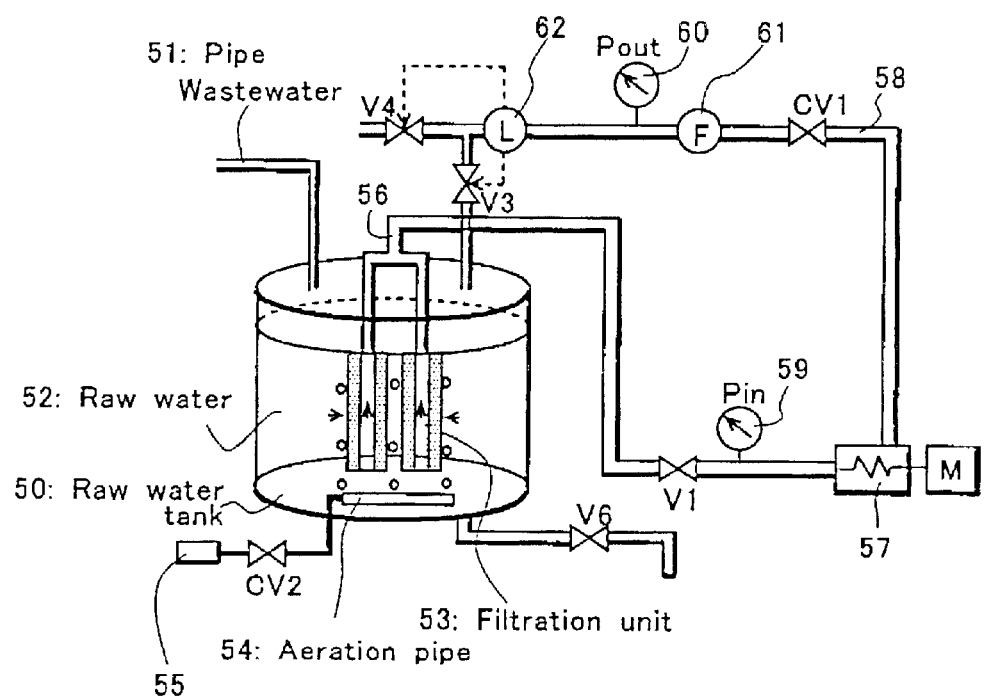
FIG. 5 is an illustration of a filtration device according to the invention.

In FIG. 5, numeral 50 indicates a raw water tank. A pipe 51 is disposed above tank 50 as a wastewater supply means, and fluid having objects of removal mixed therein flows through this pipe 51. For example in the semiconductor industry, wastewater (i.e., raw water), having objects of removal mixed therein and which flows out from a dicing machine, back-grinding machine, mirror-polishing machine, or CMP machine, passes through pipe 51. In the following description, the wastewater shall correspond to wastewater mixed with abrasive grains flowing out from a CMP machine and grinding or abrasive waste originating from abrasive grains.

A plurality of filtration units 53, each having a second filter formed therein, are disposed in raw water 52 stored in raw water tank 50. An aeration pipe 54, such as that of a bubbling device used in an aquarium and made, for example, by opening small holes in a pipe, is disposed below filtration units 53 and positioned so that air bubbles pass by the surface of filtration unit 53. This aeration pipe 54 is disposed across the entire bottom side of filtration unit 53 to enable air bubbles to be supplied uniformly across the entire surface of filtration unit 53. Numeral 55 represents an air pump. Here, filtration unit 53 refers to first filter 1, frame 4, hollow part 5, and second filter 2 shown in FIG. 1.

A pipe 56, fixed to filtration unit 53, corresponds to pipe 8 shown in FIG. 1. The fluid filtrated through filtration unit 53 flows through this pipe 56, which is connected via a valve V1 to a magnetic pump 57, which performs suction. A pipe 58 is connected from magnetic pump 57 and to valve V3 and valve 4 via control valve CV1. Also a first pressure gauge 59 is provided subsequent to pipe 56 and measures the suction pressure Pin. Furthermore, a flow meter F and a second pressure gauge 60 are disposed subsequent to control valve CV1 of pipe 58 and control is performed to maintain a fixed flow rate at flow meter 61. The flow rate of air from air pump 55 is controlled by a control valve CV2.

Raw water 52, supplied from pipe 51, is stored in raw water tank 50 and is filtrated by filtration unit 53. Air bubbles pass by the surface of second filter 2 attached to the filtration unit, and a parallel flow, generated by the ascending force and rupturing of air bubbles, causes the gelled objects of removal that adsorb onto second filter 2 to move and become adsorbed uniformly across the entire surface of filtration unit 53, thereby maintaining the filtration capability and preventing it from deteriorating.

The above-described filtration unit 53, more specifically, the filtration unit 53 that is immersed inside raw water tank 50 shall now be described with reference to FIGS. 6 and 7.

Figure 6A:
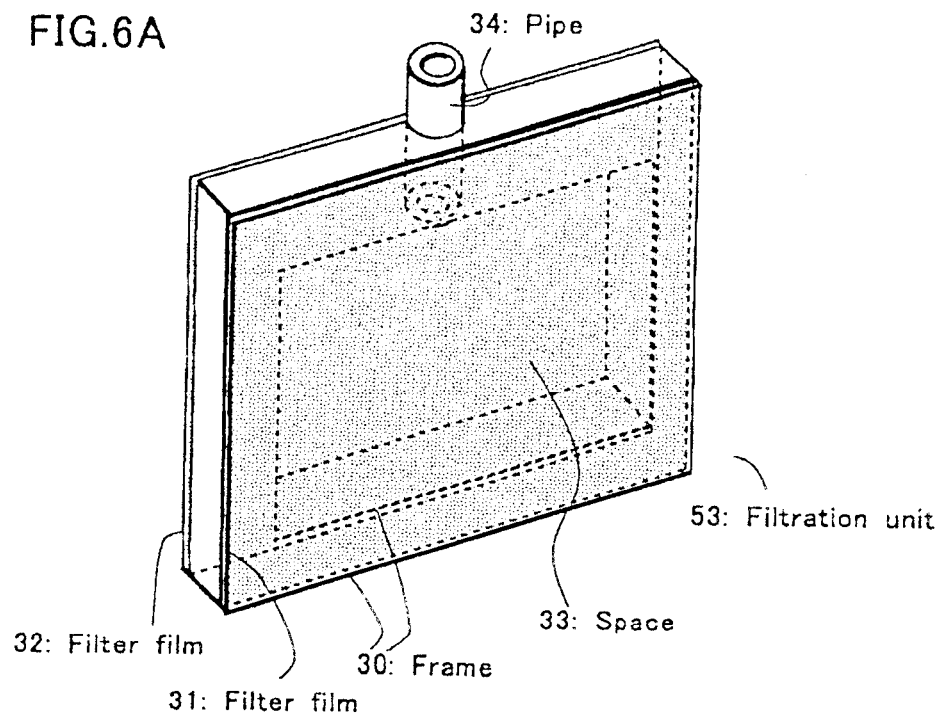
FIGS. 6A–6C are illustrations of a filtration unit according to the invention.

Reference symbol 30 in FIG. 6A indicates a frame, having the shape of a picture frame, and this corresponds to frame 4 of FIG. 1. Filter films 31 and 32, which are to become first filter 1 (FIG. 1) are adhered and fixed onto both sides of frame 30. Filtration by filter films 31 and 32 is accomplished by applying suction, via a pipe 34 (corresponding to pipe 8 of FIG. 1), to an inner space 33 (corresponding to hollow part 5 of FIG. 1), which is surrounded by frame 30 and filter films 31 and 32. Filtrated water is taken out via pipe 34 that is mounted in a sealed manner to frame 30. Needless to say, filter films 31 and 32 and frame 30 are sealed completely so as to prevent entry of wastewater into the above-mentioned space 33 from parts other than the filter films.

Since filter films 31 and 32 of FIG. 6A are thin resin films, they warp inwardly when suction is applied and may rupture in some cases. Though this space must thus be made as small as possible, in order to increase the filtration capability, space 33 must be formed to be as large as possible. This is resolved as shown in FIG. 6B. Though only nine spaces 33 are shown in FIG. 6B, many more are formed in actuality. Also, the actually employed filter film 31 is preferably a polyolefin-based polymer film with a thickness of approximately 0.1 mm and the thin filter film is formed to have a bag-like form as shown in FIG. 6B and is indicated as FT in FIG. 6B. Frame 30, with an integral pipe 34, is inserted inside this bag-like filter FT and the above-mentioned frame 30 and the above-mentioned filter FT are adhered together. Reference symbol RG indicates a presser means which presses the frame to which filter FT has been adhered from both sides. Filter FT is exposed from an opening OP of the presser means. Details shall be described again with reference to FIG. 7.

Figure 6C:
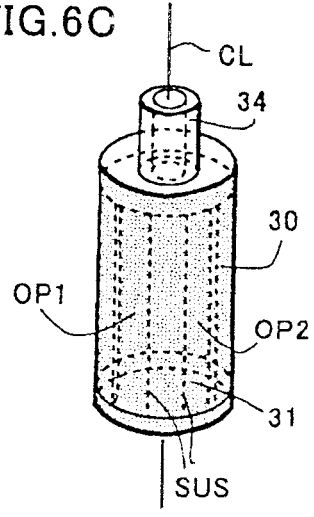
Figure 6B:
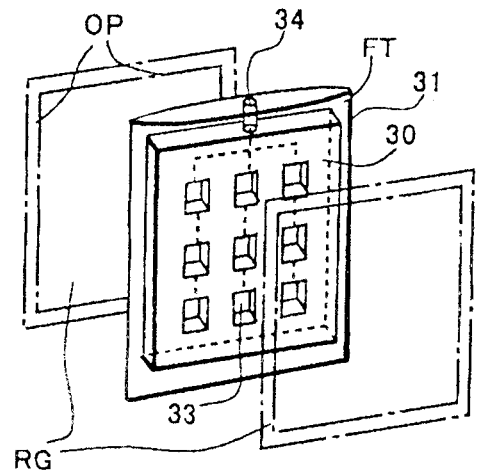

FIG. 6C shows an arrangement wherein filtration unit 53 itself is formed to have a cylindrical shape. A frame, mounted to pipe 34, is cylindrical in form and has openings OP1 and OP2 provided at its side face. Since side face parts corresponding to openings OP1 and OP2 are removed, a supporting means SUS, which supports filter film 31, is provided between the openings. Filter film 31 is adhered to the side face.

Filtration unit 53 of FIG. 6B shall now be described further with reference to FIG. 7.

First, a part 30a, corresponding to frame 30 of FIG. 6B, shall be described with reference to FIGS. 7A and 7B. In appearance, part 30a is formed to have a shape similar to corrugated cardboard. Thin resin sheets SHT1 and SHT2, each with a thickness of approximately 0.2 mm, are overlapped and a plurality of sections SC in the vertical direction are provided in between the sheets, thereby forming spaces 33 surrounded by resin sheets SHT1 and SHT2 and sections SC. Each space 33 has a rectangular cross section with a length of 3 mm and width of 4 mm, in other words, the arrangement has a shape formed by aligning and integrating a number straws with such a rectangular cross section. Part 30a maintains the filter films FT at both sides at a fixed interval with respect to each other and shall thus be referred to hereinafter as a "spacer."

Numerous holes HL of 1 mm diameter are formed on the surfaces of the thin resin sheets SHT1 and SHT2 that make up spacer 30a, and filter films FT are adhered onto these surfaces. The filtrated water that is filtrated by filter films FT thus passes through holes HL and space 33 and finally flows out via pipe 34.

Filter films FT are adhered onto both surfaces SHT1 and SHT2 of spacer 30a. The surfaces SHT1 and SHT2 of spacer 30a have parts in which holes HL are not formed, and when parts of filter film FT1 are adhered directly onto such parts, since the parts of filter FT1 corresponding to parts where holes HL are not formed have no filtration capability and do not allow passage of wastewater, parts arise at which the objects of removal will not be captured. In order to prevent this phenomenon, at least two filter films FT are adhered together. The filter film FT1 at the outermost side is the filter film that captures the objects of removal, and as the surface SHT1 of spacer 30a is approached from the side of filter film FT1, filter films with pores greater than the pores of filter film FT1 are provided, and in the present case, one such filter film FT2 is adhered. Since filter film FT2 is thus provided in between even at parts at which holes HL of spacer 30a are not formed, the entire surface of filter film FT1 exhibits a filtration function, the objects of removal are captured over the entire surface of filter film FT1, and the second filter film is formed over the entire surfaces of the front and rear surfaces FT1 and FT2. Also, though filter films FT1 and FT2 are shown as rectangular sheets due to reasons of illustration, they are preferably formed to have bag-like shapes as shown in FIG. 6B.

The manner in which the bag-like filters FT1 and FT2, spacer 30a, and presser means RG are mounted shall now be described with reference to FIGS. 7A, 7C, and 7D.

FIG. 7A is a completion diagram, FIG. 7C is a sectional view obtained by sectioning along the direction of extension (vertical direction) of pipe 34 from the head part of pipe 34 as indicated by line A—A of FIG. 7A, and FIG. 7D is a sectional view obtained by sectioning filtration unit 35 in the horizontal direction as indicated by line B—B.

As can be understood from FIGS. 7A, 7C, and 7D, spacer 30a, which is inserted inside bag-like filter film FT, has its four sides sandwiched, along with filter film FT, by presser means RG. The three sides that are closed in a bag-like manner and the remaining one side are fixed by adhesive agent AD1 applied to presser means RG. Also, a space SP is formed between the remaining side (the opening of the bag) and presser means RG, and the filtrated water that is produced in space 33 is suctioned into pipe 34 via this space SP. Also, an adhesive agent AD2 is applied along the entire periphery of openings OP of presser means RG, thereby completely sealing these openings and providing a structure with which fluid cannot enter inside from parts other than the filter.

Space 33 and pipe 34 are thus in communication, providing a structure wherein, when suction is applied from pipe 34, fluid flows towards space 33 through the pores of filter film FT and the holes HL of spacer 30a and filtrated water is transported from space 33 to the exterior via pipe 34.

The structure shown in FIG. 7 is employed for the filtration unit 53 used here, and the frame (presser means RG) to which the filter film is to be mounted is the size of A4 paper, and to be more specific, is approximately 19 cm in length, approximately 28.8 cm in width, and 5 to 10 mm in thickness. Since filtration unit 53 is actually provided at both sides of the frame, the area will be double that obtained from the above dimensions (i.e., an area of 0.109 cm$^2$). However, the number and sizes of the filtration units may be selected freely according to the size of raw water tank 50 and is determined by the required filtration rate.

An actual filtration method using the filtration unit shown in FIG. 5 shall now be described more specifically.

First, wastewater, in which objects of removal are mixed in the form of a colloidal solution, is placed in raw water tank 50 via pipe 51. A filtration unit 53, which has just first filter 1 and does not have second filter 2 formed therein, is then immersed in this tank 50 and wastewater is circulated by sucking via pipe 56 at a weak suction pressure by pump 57. The circulation path passes through filtration unit 53, pipe 56, valve V1, pump 57, pipe 58, control valve CV1, flow meter 61, optical sensor 62, and valve 63, and the wastewater is thus sucked in from tank 50 and returned to tank 50.

By this circulation, second filter 2 is formed on first filter 1 (31 in FIG. 6) of filtration unit 53, and in the final stage, the intended objects of removal in the colloidal solution become captured.

That is, when suction via first filter 1 is performed at a weak suction pressure by pump 57, the microparticles of the objects of removal gel as they approach first filter 1 and become adsorbed onto the surface of first filter 1. Of the gelled microparticles, those that are larger than the filter pores 11 of first filter 1 become adsorbed and layered gradually on the surface of first filter 1, thereby forming second filter 2, comprising a gel film. Though the gelled microparticles having a smaller diameter than filter pores 11 pass through first filter 1, as second filter 2 is formed, the water in the wastewater comes to be suctioned with the gaps of second filter 2 as pathways and removed as purified water through first filter 1 and the wastewater is thus filtrated.

The concentration of microparticles contained in the filtrated water is monitored by optical sensor 62, and filtration is started upon confirming that the amount of microparticles is lower than a desired mixing proportion. When filtration is to be started, valve V3 is closed in accordance with a detection signal from optical sensor 62 and valve V4 is opened, thereby shutting off the above-mentioned circulation path. Purified water is thus taken out from valve V4. Air bubbles, which are supplied constantly from air pump 55, are supplied from aeration pipe 54 to the surface of filtration unit 53 upon being regulated by control valve CV2.

As continuous filtration is continued, the water in the wastewater in raw water tank 50 is taken out of tank 50 as filtrated water, and the concentration of the objects to be removed in the wastewater thus increases. That is, the colloidal solution is concentrated and increased in viscosity. Wastewater is thus replenished into raw water tank 50 from pipe 51 to restrain the rise of concentration of wastewater and improve the efficiency of filtration. However, as a gel film attaches thickly onto the surface of second filter 2 of filtration unit 53, second filter 2 becomes clogged and a state wherein filtration cannot be performed is entered eventually.

When clogging of second filter 2 of filtration unit 53 occurs, the filtration capability of second filter 2 is regenerated. That is, pump 57 is stopped and the negative suction pressure that is applied to filtration unit 53 is eliminated.

Figure 8A:
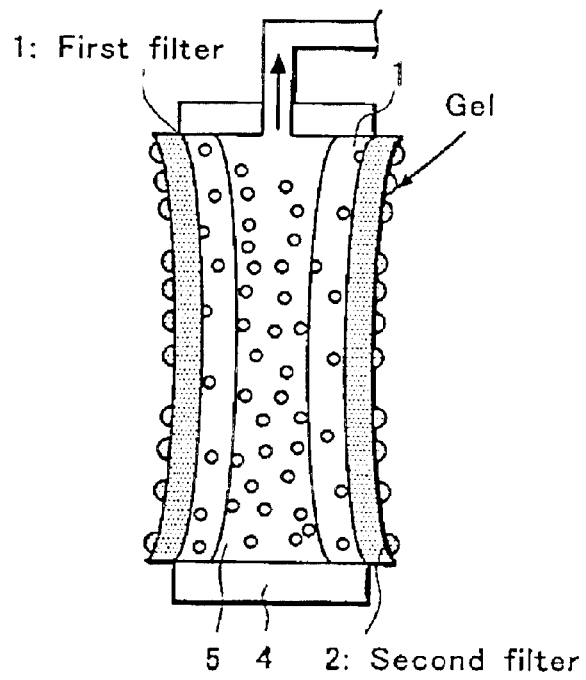
FIGS. 8A and 8B illustrate regeneration of the filtration unit according to the invention.
Figure 8B:
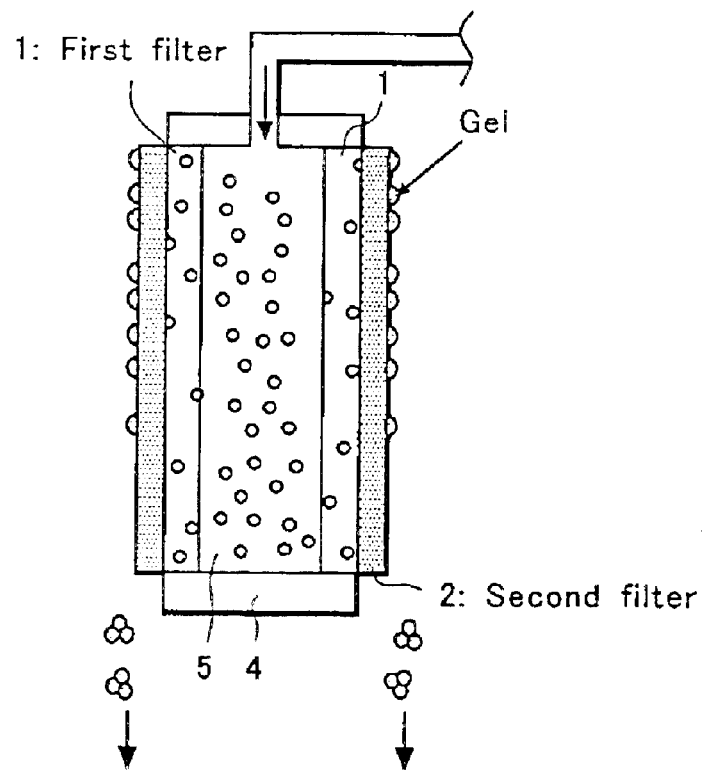

This regeneration process shall now be described in detail with reference to a schematic drawing shown in FIG. 8. FIG. 8A shows the condition of filtration unit 53 during the filtration process. Since hollow part 5 of first filter 1 is set at a negative pressure in comparison to the outer side due to the weak suction pressure, first filter 1 takes on a shape that is concave toward the inner side. Second filter 2, which is adsorbed on the surface of first filter 1, thus takes on a similar, inwardly-concave shape. The same applies to the gel film that is gradually adsorbed onto the surface of second filter 2.

In the regeneration process, since the weak suction pressure is stopped and the pressure returns substantially to atmospheric pressure, first filter 1 of filtration unit 53 returns to its original state. Second filter 2 and the gel film adsorbed to its surface likewise return to their original state. Consequently, since the suction pressure that had caused adsorption of the gel film is first of all eliminated, the gel film loses the force of adsorption onto filtration unit 53 and, at the same time, receives an outwardly expanding force. The adsorbed gel film thus begins to separate from filtration unit 53 due to its own weight. It is furthermore preferable to increase the amount of air bubbles from aeration pipe 54 by approximately two times in order to promote this separation. Experiments have shown that the separation begins from the lower end of filtration unit 53 and then the gel film of second filter 2 on the surface of first filter 1 separates in an avalanche-like manner and settles to the bottom of raw water tank 50. Thereafter, second filter 2 may be formed again by circulating wastewater along the above-described circulation path. In this regeneration process, second filter 2 returns to its original state and when it has been revived to the state enabling wastewater, the wastewater is again filtrated.

Furthermore, when filtrated water is made to flow in reverse into hollow part 5 in this regeneration process, return of first filter 1 to its original state is aided and application of the hydrostatic pressure of the filtrated water applies an outwardly swelling force, and the filtrated water passes through the filter pores 11 from the inner side of first filter 1 and seeps into the boundary between first filter 1 and second filter 2 to promote separation of the gel film of second filter 2 from the surface of first filter 1.

As mentioned above, as filtration is continued while regenerating second filter 2, the concentration of the objects of removal in the wastewater in raw water tank 50 increases and the wastewater comes to have a considerable viscosity. Thus, when the concentration of the objects of removal in the wastewater exceeds a predetermined concentration, the filtration operation is stopped and the system is left idle for sedimentation. Concentrated slurry thus collects at the bottom of tank 50 and this gel-like concentrated slurry is recovered by opening valve 64. The recovered concentrated slurry is compressed or dried by heating to remove the water contained therein and thereby further reduce its weight. The amount of slurry to be handled as industrial weight can thereby be reduced significantly.

The operation conditions of the filtration unit shown in FIG. 5 shall now be described with reference to FIG. 9. The operation conditions are those for the case where both surfaces (area: 0.109 m$^2$) of the above-described single filtration unit 53 of A4 size are used. The initial flow rate is set at 3 cc/hour (0.08 m$^3$/day), at which the filtration efficiency is as good as was mentioned above, and the post-regeneration flow rate is set to this value as well. The air blow rate is set to 1.8 L/minute during film formation and filtration and to 3 L/minute during regeneration. "Pin" and "Regeneration Pin" are suction pressures and are measured by pressure gauge 59. "Pout" and "Regeneration Pout" are pressures at pipe 58 and are measured by pressure gauge 60. The flow rate and regeneration flow rate are measured by flow meter 61 and express the rate of filtration by suction from filtration unit 53.

Figure 9:
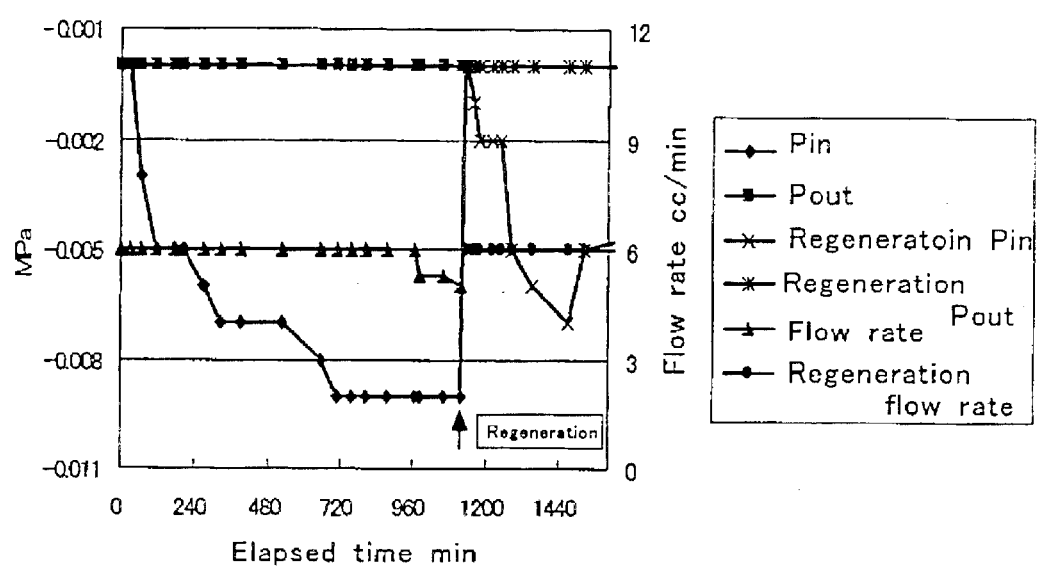
FIG. 9 is an illustration for describing the operation conditions of the filtration device according to the invention.

In FIG. 9, the Y-axis at the left side indicates pressure (unit: MPa) and the negative pressure becomes greater as the X-axis is approached. The Y-axis at the right side indicates the flow rate (unit: cc/minute). The X-axis indicates the time elapsed from film formation (unit: minutes).

A characteristic point of this invention is that the flow rate and regeneration flow rate are controlled and maintained at 3 cc/hour in the second filter 2 formation process, the filtration process, and the post-regeneration filtration process. Thus, in the film formation process, Pin is set to an extremely weak suction pressure of −0.001 MPa to −0.005 MPa to form second filter 2 with a softly adsorbed gel film.

Then in the filtration process, Pin is increased gradually from −0.005 MPa and filtration is continued while securing a fixed flow rate. Filtration is continued for approximately 1000 minutes and the regeneration process is carried out when the flow rate begins to decrease. This is because the gel film attaches thickly onto the surface of second filter 2 and causes clogging.

Then when the regeneration of second filter 2 is performed, filtration is continued at a fixed regeneration flow rate while gradually increasing the regeneration Pin. Regeneration of second filter 2 and refiltration are carried out until raw water 52 reaches a predetermined concentration, or to be more specific, until the degree of concentration is increased by 5 to 10 times.

As an operation method that differs from that described above, a method of performing filtration by fixing the suction pressure at −0.005 MPa, at which the filtration flow rate is high, may also be employed. Though the filtration flow rate decreases gradually in accompaniment with the clogging of second filter 2 in this case, there is provided the advantage that the filtration time can be increased and control of pump 57 is simplified. The regeneration of second filter 2 can thus be carried out when the filtration flow rate decreases to or below a fixed value.

Figure 10A:
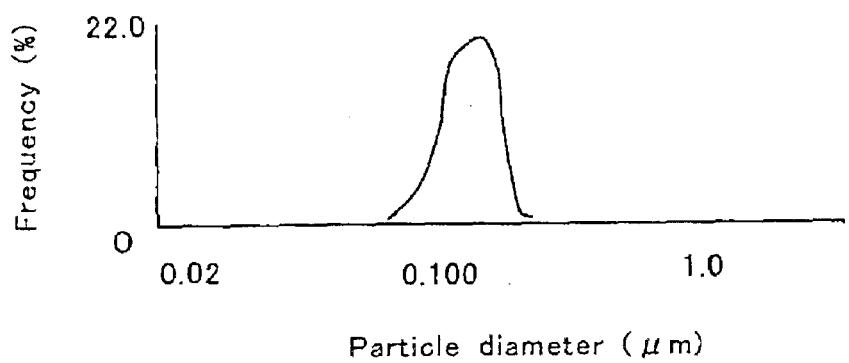
FIGS. 10A and 10B illustrate filtration characteristics according to the invention.

FIG. 10A shows the particle size distribution of abrasive grains contained in a CMP slurry. These abrasive grains are for CMP of an interlayer insulation film comprising Si oxide and the material comprises Si oxide and is generally called silica. The minimum particle size was approximately 0.076 μm and the maximum particle size was 0.34 μm. The larger particles are aggregate particles formed by aggregation of a plurality of the particles. The average particle size was approximately 0.1448 μm and the distribution peaks in the range of 0.13 μm to 0.15 μm near the average particle size. As a slurry regulator, KOH or NH3 is generally used. The pH lies between approximately 10 and 11.

To be more specific, CMP abrasive grains that are mainly used are silica-based, alumina-based, cerium-oxide-based, or diamond-based, and besides these, there are chromium-oxide-based, iron-oxide-based, manganese-oxide-based, BaCO4-based, antimony-oxide-based, zirconia-based, and yttria-based abrasive grains. Silica-based abrasive grains are used for smoothing semiconductor interlayer insulation films, P—Si, SOI, etc., and smoothing of Al•glass disks. Alumina-based abrasive grains are used for polishing hard disks and smoothing metals in general, Si oxide films, etc. Cerium oxide is used for polishing glass and polishing Si oxide, and chromium oxide is used for mirror polishing steel. Manganese oxide and BaCO4 are used for polishing tungsten wiring.

Furthermore, there are sols called oxide sols, with which colloid-size microparticles, comprising a metal oxide, such as silica, aluminum, zirconia, or partly comprising a hydroxide, are dispersed uniformly in water or another liquid. Such oxide sols are used for smoothing interlayer insulation films and metals of semiconductor devices and are also being considered for use with aluminum disks and other information disks.

Figure 10B:
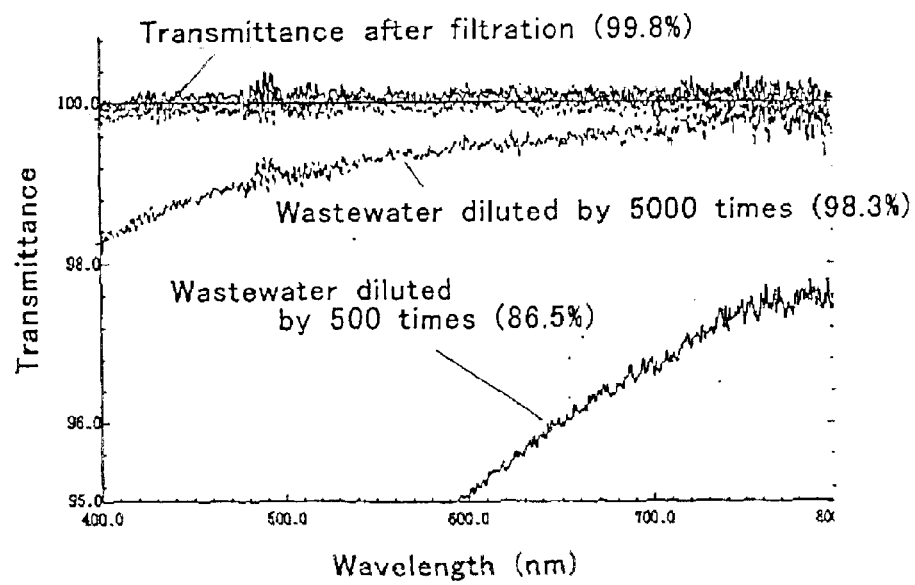

FIG. 10B shows data indicating that CMP wastewater is filtrated and abrasive grains are captured. With this experiment, the undiluted slurry described above was diluted by 50 times, 500 times, and 5000 times with pure water to prepare test solutions. These three types of test solutions were prepared under the hypothesis that since a wafer is washed with pure water in a CMP process, the wastewater will be diluted by approximately 50 to 5000 times.

Measurements of the optical transmittance of these three types of test solution for light of a wavelength of 400 nm showed that for the test solution of 50 times dilution, the optical transmittance was 22.5%, for the test solution of 500 times dilution, the optical transmittance was 86.5%, for the test solution of 5000 times dilution, the optical transmittance was 98.3%. In principle, if abrasive grains are not contained in the wastewater, light will not be scattered, and the optical transmittance will take on a value infinitesimally close to 100%.

When a filter, with the above-described second filter film 13 formed, was immersed in each of the three types of test solution and filtration was carried out, the transmittance after filtration became 99.8% for all three types. Since the optical transmittance after filtration is greater than the optical transmittance prior to filtration, abrasive grains have been captured. The transmittance data for the test solution of 50 times dilution does not appear in the drawing since its value was too small.

The above results show that when objects of removal of a colloidal solution discharged from a CMP machine are filtrated using second filter 2 formed from a gel film of filtration unit 53 provided in this invention's filtration device, filtration could be performed with a transmittance of 99.8%.

A specifically realized filtration device having a regeneration circuit added shall now be described with reference to FIG. 11. The components that are the same as those of the filtration device shown in FIG. 5 are provided with the same symbols.

Figure 11:
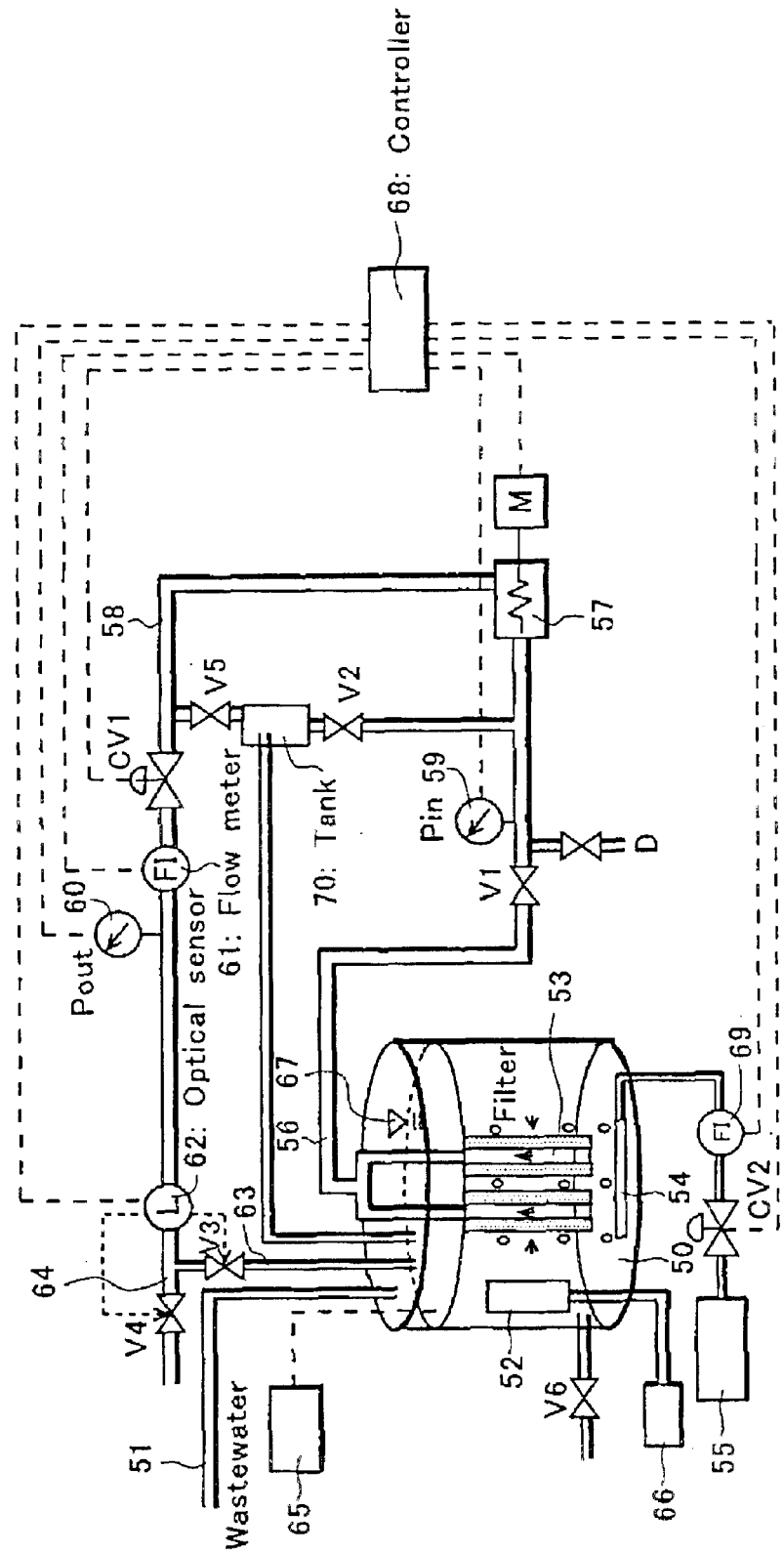
FIG. 11 is an illustration for describing a filtration device according to the invention.
Figure 13:
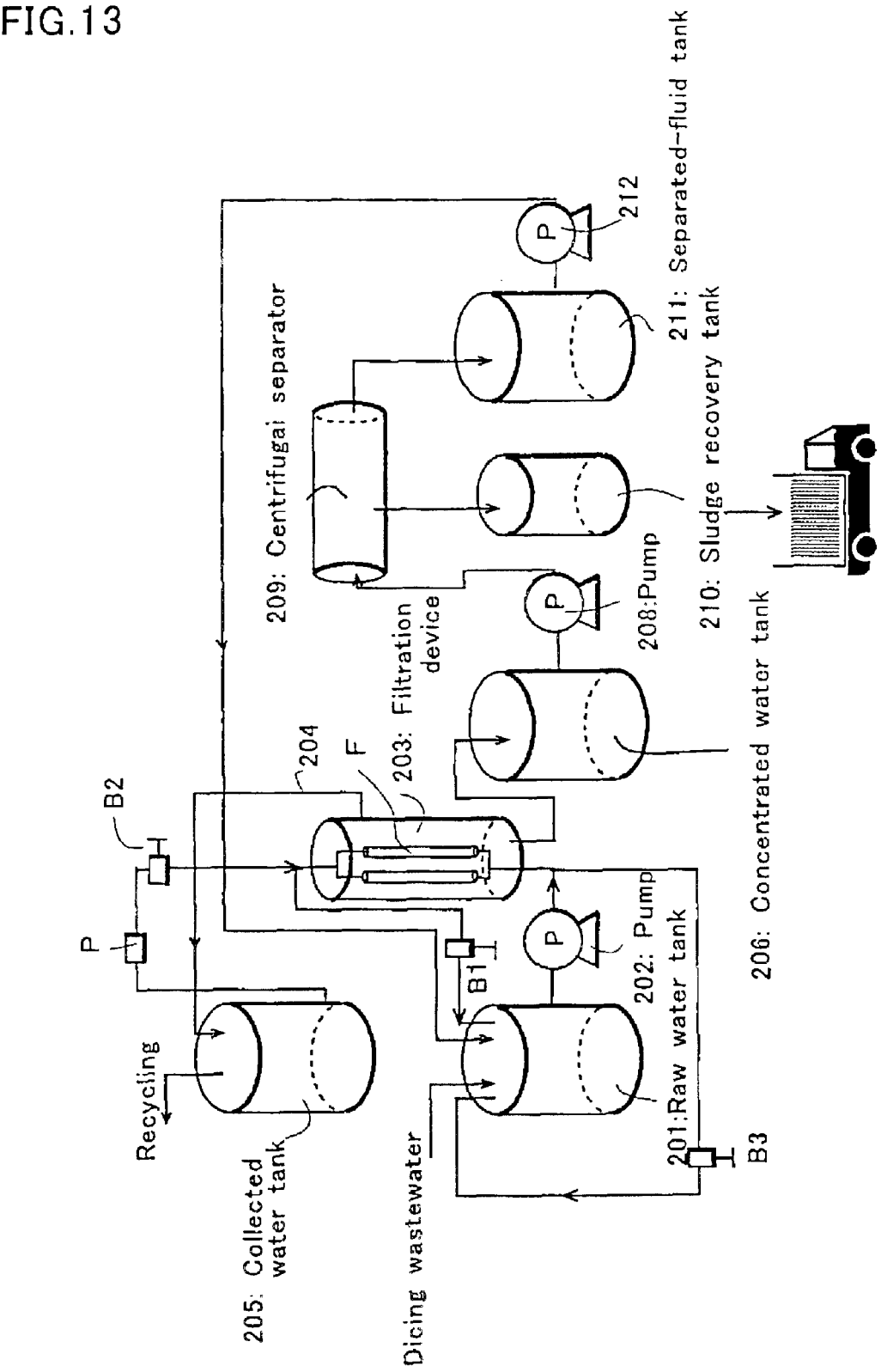
FIG. 13 is an illustration for describing a prior-art filtration system.
Figure 14:
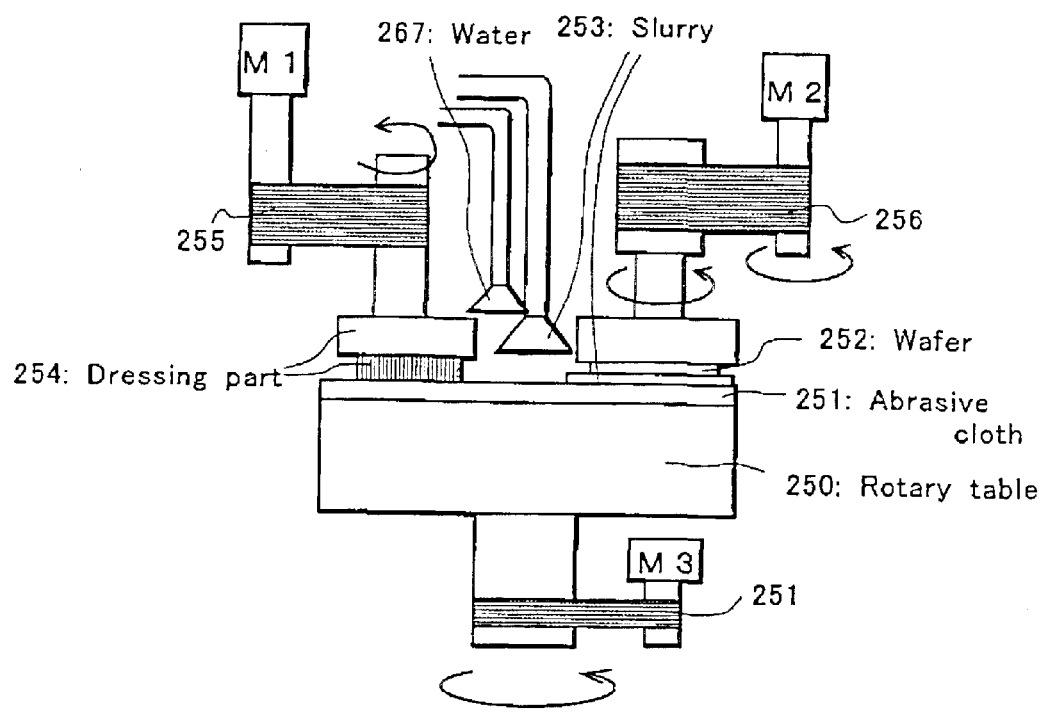
FIG. 14 is an illustration for describing a CMP machine.
Figure 15:
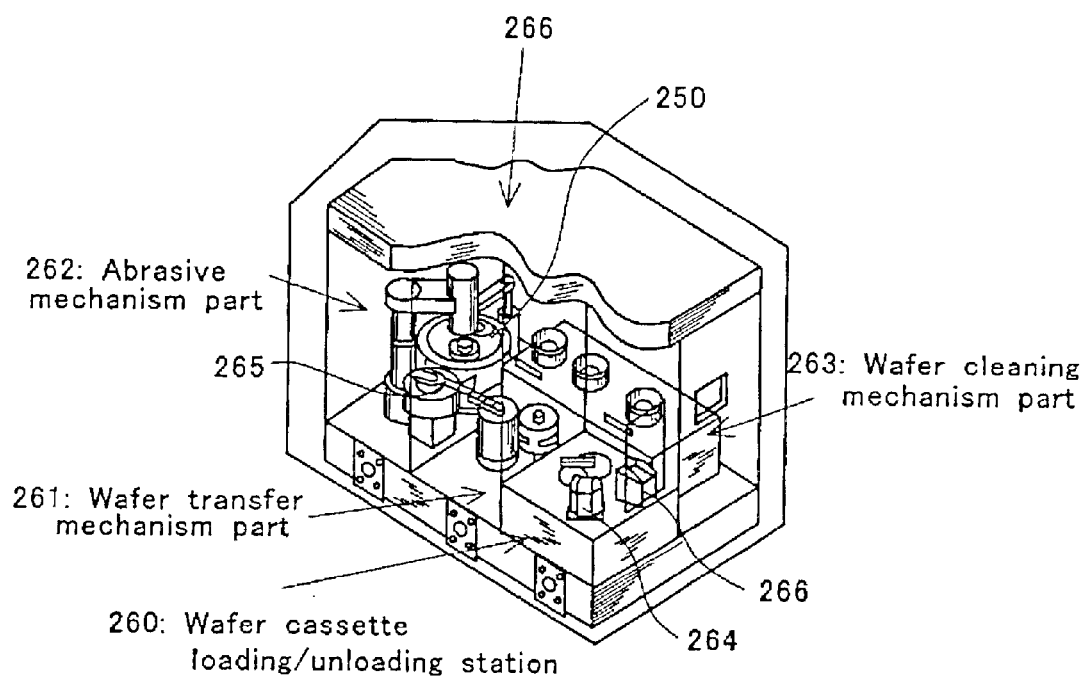
FIG. 15 is an illustration for describing a CMP machine system.

In FIG. 11, numeral 50 indicates a raw water tank. A pipe 51 is disposed above tank 50 as a wastewater supply means, and fluid having objects of removal mixed therein flows through the pipe 51. For example, in the semiconductor industry, wastewater (i.e., raw water), having objects of removal mixed therein and which flows out from a dicing machine, back-grinding machine, mirror-polishing machine, or CMP machine, passes through pipe 51. In the following description, the wastewater shall correspond to wastewater in which mixed abrasive grains flow out from a CMP machine and grinding or abrasive waste originates from the abrasive grains.

A plurality of filtration units 53, each having a second filter formed therein, are disposed in the raw water 52 stored in raw water tank 50. An aeration pipe 54, such as that of a bubbling device used in an aquarium and made for example by opening small holes in a pipe, is positioned below filtration units 53 and disposed across the entire bottom sides of filtration units 53 so that bubbles pass by the surfaces of filtration units 53. Numeral 55 is an air pump. Air is supplied from air pump 55 and is guided to aeration pie 54 via control valve CV2 and air flow meter 69 for control of the air flow rate. Here, filtration unit 53 refers to first filter 1, frame 4, hollow part 5, and second filter 2, as shown in FIG. 1.

A pipe 56, fixed to filtration unit 53, corresponds to pipe 8 shown in FIG. 1. The fluid filtrated through filtration unit 53 flows through this pipe 56, which is connected via a valve V1 to a magnetic pump 57, which performs suctioning. A pipe 58 is connected from magnetic pump 57 and to valve V3 and valve V4 via a first control valve CV1. Also, a first pressure gauge 59 is provided subsequent pipe 56 and measures the suction pressure Pin. Furthermore, a flow meter 61 and a second pressure gauge 60 are disposed subsequent first control valve CV1 of pipe 58 and control is performed to maintain a fixed flow rate at flow meter 61.

Pipe 58 is connected to optical sensor 62 and from optical sensor 62 onwards, the flow path is guided to the branched pipes 63 and 64. Valves V3 and V4, the opening and closing of which are switched in accordance with a detection signal from optical sensor 62, are inserted in pipes 63 and 64, pipe 63 returns filtrated water to tank 50, and pipe 64 is arranged for taking filtrated water out to the exterior. The concentration of microparticles contained in the filtrated water is monitored by optical sensor 62, and filtration is started upon confirming that the amount of microparticles is lower than a desired mixing proportion. When filtration is to be started, valve V3 is closed in accordance with the detection signal from optical sensor 62 and valve V4 is opened to thereby take purified water out to the exterior.

Auxiliary tank 70 is connected via valve V5 to a pipe 58 and serves to collect filtrated water, and when the amount of filtrated water exceeds a fixed amount, the water overflows and is returned via pipe 71 to tank 50. A valve V2 is provided at a bottom part of auxiliary tank 70 and this is connected to pipe 56. This auxiliary tank 70 is installed at a position that is approximately 10 to 20 cm higher than the liquid level of tank 50 and is used to regenerate the second filter.

Tank 50 is furthermore provided with a pH adjuster 65 and a heater/cooler 66 for adjustment of the pH, in particular, of CMP wastewater to approximately 6 to 7 and adjustment of the wastewater temperature for promotion of gelation. In order to prevent wastewater from overflowing tank 50, the liquid level is monitored by liquid level gauge 67 and the inflow rate of wastewater is adjusted accordingly.

Furthermore, a controller 68, which controls the operation of this filtration device, is provided for controlling control valves CV1 and CV2, flow meters 61 and 69, pump 57, pressure gauges 59 and 60, optical sensor 62, etc., according to each process as indicated by the dotted lines in FIG. 11.

With the above-described filtration device, the respective valves, etc., are opened/closed and the operations of pump 57, etc., are controlled by controller 68 in the second filter forming process, filtration process, second filter regeneration process, refiltration process, and maintenance process. The operation conditions shall now be described according to each process. The operation conditions of pump 57, optical sensor 62, air pump 55, and the respective valves in the respective processes are shown in FIG. 12.

First, wastewater, in which objects of removal are mixed in the form of a colloidal solution, is placed in raw water tank 50 via pipe 51. Filtration units 53, each having just first filter 1 and not having second filter 2 formed therein, are then immersed in a spaced manner in the tank 50. The number of filtration units 53 immersed is that by which the desired filtration flow rate can be obtained. To be more specific, about 10 to 40 filtration units 53 are suspended by an unillustrated supporting means. This number will obviously differ according to the filtration area of each filtration unit 53 and the total necessary filtration area of filtration units 53 is determined from the size of tank 50.

The process of forming second filter 2 is then begun. Wastewater in tank 50 is circulated by suctioning via pipe 56 at a weak suction pressure by pump 57. The circulation path passes through filtration units 53, pipe 56, valve V1, pump 57, pipe 58, control valve CV1, flow meter 61, optical sensor 62, and valve V3, and the wastewater is thus sucked in from tank 50 and returned to tank 50. Bubbles of air, supplied from air pump 55 and via control valve V2, rise from aeration pipe 54 and are supplied to the surfaces of filtration units 53. In this process, the other valves V2, V4, V5, V6, and D are closed.

By circulation of wastewater, second filter 2 is formed on first filter 1 (31 in FIG. 6) of filtration unit 53, and in the final stage, the intended objects of removal in the colloidal solution become captured. That is, when suction via first filter 1 is performed at a weak suction pressure by pump 57, the microparticles of the objects of removal gel as they approach first filter 1 and become adsorbed onto the surface of first filter 1. Of the gelled microparticles, those that are larger than the filter pores 11 of first filter 1 become adsorbed and layered gradually on the surface of first filter 1, thereby forming second filter 2, comprising a gel film. Though the gelled microparticles having a smaller diameter than filter pores 11 pass through first filter 1, as second filter 2 is formed, the water in the wastewater comes to be suctioned with the gaps of second filter 2 as pathways and removed as purified water through first filter 1 and the wastewater is thus filtrated.

The concentration of microparticles contained in the filtrated water is monitored by optical sensor 62 in this process, and the filtration process is begun upon confirming that the amount of microparticles is lower than a desired mixing proportion.

Subsequently when formation of second filter 2 is completed, the filtration process is begun. When filtration is started, valve V3 is closed in accordance with a detection signal from optical sensor 62, valve V4 is opened, thereby shutting off the above-mentioned circulation path, and filtrated water is removed from valve V4. In this process, control is performed by controller 68 so that the filtration flow rate at flow meter 61 will be fixed and an operation is performed to prevent as much clogging of second filter 2 as possible and to maintain a long filtration time. As shown in FIG. 9, the suction pressure Pin of pump 57 is increased gradually to keep the filtration flow rate fixed. The operation conditions of the other parts are the same as those during the film forming process.

When second filter 2 is destroyed due to some reason, the mixing in of microparticles is detected by optical sensor 62, valve V4 is closed, and oppositely, valve V3 is opened to return the filtrated water to tank 50. That is, a return to the film forming process is carried out in order to repair second filter 2 and when the conditions return to normal, the filtration process is begun again.

As continuous filtration is continued, the water in the wastewater in raw water tank 50 is removed from tank 50 as filtrated water, and the concentration of the objects to be removed in the wastewater thus increases. That is, the colloidal solution is concentrated and increased in viscosity. Wastewater is thus replenished into raw water tank 50 from pipe 51 to restrain the rise of concentration of wastewater and improve the efficiency of filtration. However, as a gel film attaches thickly onto the surface of second filter 2 of filtration unit 53, second filter 2 becomes clogged and a state wherein filtration cannot be performed is eventually entered.

When the gel film of second filter 2 becomes adsorbed thickly on the surface of first filter 1, this is detected as a decrease of the filtration flow rate by flow meter 61 and a transition from the filtration process to the second filter regeneration process is carried out by controller 68.

First in the regeneration process, pump 57 is stopped and the negative suction pressure that is applied to filtration unit 53 is eliminated. At the same time, valve V2 is opened and the previously collected filtrated water in auxiliary tank 70 flows in reverse through pipe 56 via valve V1 and is delivered to the hollow part 5 of filtration unit 53.

Thus, in the regeneration process, since the weak suction pressure is stopped and the pressure returns substantially to atmospheric pressure, first filter 1 of filtration unit 53 returns to its original state from the concave state. Second filter 2 and the gel film adsorbed to its surface likewise return to their original state. Consequently, since the suction pressure that had caused adsorption of the gel film is first of all eliminated, the gel film loses the force of adsorption onto filtration unit 53 and, at the same time, receives an outwardly expanding force. Furthermore, since auxiliary tank 70 is disposed at a position that is higher than the liquid level of tank 50, a hydrostatic pressure due to the height difference is applied by the reverse flow of filtrated water from auxiliary tank 70, thus applying a further force that swells first filter 1 and second filter 2 of filtration unit 53 outwards. The adsorbed gel film thus begins to separate from filtration unit 53 due to its own weight and hydrostatic pressure. It is furthermore preferable to increase the amount of bubbles from aeration pipe 54 by approximately two times in order to promote this separation. Experiments have shown that the separation begins from the lower end of filtration unit 53 and then the gel film of second filter 2 on the surface of first filter 1 separates in an avalanche-like manner and settles to the bottom of raw water tank 50. Subsequently, second filter 2 may be reformed by circulating wastewater along the above-described circulation path. In this regeneration process, second filter 2 returns to its original state and when it has been revived to the state enabling wastewater filtration, the wastewater filtration is carried out again. At this point, valve V2 is closed and valve V5 is opened to collect filtrated water in auxiliary tank 70 for the next regeneration process. Thereafter, the refiltration process is begun and the wastewater filtration is started again. The operation conditions are the same as the filtration process. As filtration is thus continued while regenerating second filter 2, the concentration of the objects of removal in the wastewater in raw water tank 50 increases and the wastewater comes to have a considerable viscosity. Thus, when the concentration of the objects of removal in the wastewater exceeds a predetermined concentration, the filtration operation is stopped and a transition to the maintenance process is carried out.

The maintenance process includes draining out the filtrated water in pipes 56 and 58 and draining out the wastewater in tank 50 and the gel that has collected at the bottom of tank 50.

In the prior step, pump 57 and air pump 55 are stopped, control valve CV1 and valves V1, V2, and V5 are opened, and the filtrated water in pipes 56 and 58 and auxiliary tank 70 are drained out to the exterior by a draining valve D provided at pipe 56.

In the latter step, the system is left still for coagulating sedimentation, thus making concentrated slurry collect at the bottom of tank 50, and this gel-like concentrated slurry is recovered by opening valve V6. The recovered concentrated slurry is compressed or dried by heating to remove the water contained therein and thereby further reduce its weight. The amount of slurry to be handled as industrial weight can thereby be reduced significantly. The supernatant wastewater is likewise drained out via valve V6 and is returned to tank 50 in the subsequent filtration process.

Generally, in order to remove microparticles of a size class of mainly 0.15 $\mu$m or less, such as the abrasive grains mixed in a CMP slurry, a filter film with pores smaller than such microparticles should be employed. However, since such a filter film does not exist, such filtration could not be performed. However, this invention realizes a filtration device that enables, by formation of a gel film filter, the filtration of the objects of removal of a colloidal solution without the use of a filter film with pores that are 0.15 μm or less.

Also, since the gel film filter is formed from a fluid of the objects of removal contained in a sol, filtration without a coagulant or other chemical and without using a filter with microscopic pores is realized.

Furthermore, the second filter comprising the gel film can be formed by gelling of microparticles onto the surface of the first filter, and by setting a weak suction pressure and suctioning the wastewater slowly, a filtration device of extremely high filtration efficiency is realized.

Furthermore, by selecting optimal forming conditions for the second filter comprising the gel film and keeping the filtration flow rate or suction pressure fixed, a filtration device that is extremely unlikely to be subject to clogging and having an extremely long filtration time is realized.

Furthermore, filtration of CMP slurries used for manufacture of CSP semiconductor devices is realized and a filtration device is realized that enables the large quantities of abrasive grains contained in a CMP slurry and the electrode material waste, silicon and silicon oxide film waste, which are discharged by CMP, to be filtrated at the same time.

Furthermore, with this invention, since the gel that becomes adsorbed onto the surface of the second filter due to continued filtration can be separated using the gel's own weight by stopping the suction by the pump, the filtration device that is provided is one by which the regeneration of the second filter can be carried out readily. The filtration device is thus one that enables the filtration process, regeneration process, and refiltration process to be repeated several times and enable filtration to be continued over an extremely long period of time.

Furthermore with this invention, the gel film of the second filter that has become adsorbed onto the surface of the first filter is separated using the outwardly swelling force of the filtration unit as it returns to its original state by simply stopping the suction by the pump in the process of regenerating the second filter. This invention thus provides the advantage of making the burdensome process of reverse washing, which was required with prior-art filtration devices, completely unnecessary. There is also provided the advantage that by increasing the amount of bubbles in the regeneration step in comparison to that during the filtration step, forces generated by the ascending force and rupturing of the bubbles are added to the surface of the first filter to thereby promote the separation of the gel film of the second film. There is furthermore provided the advantage that hydrostatic pressure due to height difference can be applied additionally by reverse flow of filtrated water from the auxiliary tank to the filtration unit to thereby further promote the separation of the gel film.

Yet furthermore, since with a filtration device that realizes the present invention, suction by a weak suction pressure is carried out so as not to clog the second filter, the effects may be realized by a small pump. Moreover, since filtrated water passes through the pump, there is no fear of wear due to the objects of removal and the life of the pump is extended significantly. The system scale can thus be reduced, savings can be made in the electric cost for pump operation, and since pump replacement costs are also held down significantly, both the initial cost and running cost can be reduced.

Also, since the wastewater is concentrated by simply using the raw water tank, extra piping, tanks, pumps, etc., are unnecessary and a resource-saving filtration system can be arranged.

What is claimed is:

1. A filtration device, comprising:
   a tank containing a fluid that contains objects of removal in the form of a colloidal solution;
   a filtration unit comprising a first filter, which is immersed inside the tank, and a second filter comprising a gel film that is adsorbed onto a surface of the first filter;
   a pump to suction the fluid via a first pipe connected to the filtration unit; and
   a second pipe by which the filtrated fluid is removed by the pump out to an exterior of the tank,
   wherein the objects of removal in the fluid are concentrated in the tank, a flow meter is inserted inside the second pipe and the suction pressure of the pump is controlled so as to keep a filtration flow rate measured by the flow meter fixed.

2. A filtration device, comprising:
   a tank containing a fluid that contains objects of removal in the form of a colloidal solution;
   a filtration unit comprising a first filter, which is immersed inside the tank, and a second filter comprising a gel film that is adsorbed onto a surface of the first filter;
   a pump to suction the fluid via a first pipe connected to the filtration unit; and
   a second pipe by which the filtrated fluid is removed by the pump out to an exterior of the tank,
   and switching between the third and fourth pipes is carried out in accordance with an optical transmittance detected by the optical sensor.

3. A filtration device comprising:
   a tank containing a fluid that contains objects of removal in the form of a colloidal solution;
   a filtration unit comprising a first filter, which is immersed inside the tank, and a second filter comprising a gel film that is adsorbed onto a surface of the first filter;
   a pump to suction the fluid via a first pipe connected to the filtration unit;
   a second pipe by which the filtrated fluid is removed by the pump out to an exterior of the tank; and
   a third pipe by which the filtrated fluid is removed from the tank; and
   a fourth pipe to return filtrated fluid to the tank, the third pipe and the fourth pipe being branched, via an optical sensor, from the second pipe,
   wherein in a process of forming the second filter, the fluid is circulated along a path running from the filtration unit to the first pipe, the pump, the second pipe, the optical sensor, and the fourth pipe.

4. The filtration device according to claim 3, wherein the second filter is a gel film formed from the objects of removal.

5. The filtration device according to claim 3, wherein a suction pressure of the pump during formation of the second filter is set lower than a suction pressure during filtration to form the second filter gently and keep the filtration flow rate fixed during formation of the second filter and during filtration.

6. The filtration device according to claim 3, wherein a suction pressure of the pump during formation of the second filter is set lower than the suction pressure during filtration to form the second filter gently and keep the suction pressure fixed during formation of the second filter and during filtration.

7. The filtration device according to claim 3, wherein switching from the fourth pipe to the third pipe is carried out to transfer to the filtration process when an optical transmittance detected by the optical sensor becomes greater than or equal to a fixed value.

8. The filtration device according to claim 3, wherein the objects of removal comprise microparticles of 0.15 µm or less.

9. A filtration device comprising:
- a tank containing a fluid that contains objects of removal in the form of a colloidal solution;
- a filtration unit comprising a first filter, which is immersed inside the tank, and a second filter comprising a gel film that is adsorbed onto a surface of the first filter;
- a pump to suction the fluid via a first pipe connected to the filtration unit;
- a second pipe by which the filtrated fluid is removed by the pump out to an exterior of the tank; and
- a flow meter inserted in the second pipe,
- wherein in a process of filtering the fluid by the filtration unit, a suction pressure of the pump is increased so as to keep a filtration flow rate measured by the flow meter constant.

10. The filtration device according to claim 9, wherein the second filter is a gel film formed from the objects of removal.

11. The filtration device according to claim 9, wherein the objects of removal comprise microparticles of 0.15 µm or less.

12. A filtration device comprising:
- a tank containing a fluid that contains objects of removal in the form of a colloidal solution;
- a filtration unit comprising a first filter, which is immersed inside the tank, and a second filter comprising a gel film that is adsorbed onto a surface of the first filter;
- a pump for suctioning the fluid via a first pipe connected to the filtration unit;
- a second pipe for taking filtrated fluid from the pump out to an exterior of the tank; and
- an auxiliary tank connected to the first pipe and collecting filtrated fluid,
- wherein when the second filter becomes clogged and a filtration flow rate decreases, the pump is stopped to eliminate the suction pressure applied to the filtration unit and the filtrated fluid collected in the auxiliary tank is made to flow in reverse via the first pipe to the filter to thereby apply hydrostatic pressure to the filtration unit from inside to cause the first filter to swell outwards and to cause the gel that has become adsorbed onto the surface of the second filter to separate.

13. The filtration device according to claim 12, wherein the second filter is a gel film formed from the objects of removal.

14. The filtration device according to claim 12, wherein the hydrostatic pressure is determined by a difference in a liquid level of the auxiliary tank and that of the tank.

15. The filtration device according to claim 12, wherein an aeration pipe is disposed at a bottom part of the tank and an amount of bubbles generated is increased in comparison to that during filtration.

16. The filtration device according to claim 15, wherein the aeration pipe is disposed across an entire bottom side of the filtration unit.

17. The filtration device according to claim 12, wherein when regeneration of the second filter is completed, the pump is operated to start re-filtration of the fluid.

18. The filtration device according to claim 12, wherein when regeneration of the second filter is completed, the pump is operated to start re-filtration of the fluid and the filtrated water is supplied to the auxiliary tank.

19. The filtration device according to claims 12, wherein the objects of removal comprise microparticles of 0.15 µm or less.

* * * * *